(12) United States Patent
Kumagai et al.

(10) Patent No.: US 11,932,020 B2
(45) Date of Patent: Mar. 19, 2024

(54) LIQUID CONTAINER

(71) Applicant: SEIKO EPSON CORPORATION, Tokyo (JP)

(72) Inventors: Keiichi Kumagai, Matsumoto (JP); Shogo Nakada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 631 days.

(21) Appl. No.: 17/113,932

(22) Filed: Dec. 7, 2020

(65) Prior Publication Data
US 2021/0170755 A1    Jun. 10, 2021

(30) Foreign Application Priority Data
Dec. 10, 2019   (JP) .................. 2019-222736

(51) Int. Cl.
*B41J 2/17*   (2006.01)
*B01J 20/28*   (2006.01)
*B41J 2/165*   (2006.01)
*B41J 2/185*   (2006.01)

(52) U.S. Cl.
CPC ....... *B41J 2/1721* (2013.01); *B01J 20/28042* (2013.01); *B41J 2/165* (2013.01); *B41J 2002/1728* (2013.01); *B41J 2002/1856* (2013.01)

(58) Field of Classification Search
CPC .... B41J 2/1721; B41J 20/28042; B41J 2/165; B41J 2002/1728; B41J 2002/1856; B01J 20/28042
See application file for complete search history.

(56) References Cited

U.S. PATENT DOCUMENTS

2014/0184693 A1*  7/2014  Tsujino ............... B41J 2/1721
                                                            347/36

FOREIGN PATENT DOCUMENTS

| AU | 2010342025 B2 * | 5/2015 | ........... A61F 13/53 |
| JP | 2003-080728 | 3/2003 | |
| JP | 2019-171597 | 10/2019 | |
| JP | 2019171598 A * | 10/2019 | |
| JP | 2019171603 A * | 10/2019 | ........... B41J 2/055 |

\* cited by examiner

*Primary Examiner* — Sharon Polk
(74) *Attorney, Agent, or Firm* — WORKMAN NYDEGGER

(57) ABSTRACT

A liquid container includes: a case having a liquid introduction port through which liquid is introduced and a storage portion that stores the liquid; and an absorber stored in the case and configured to absorb the liquid. The absorber includes multiple absorbent resins that swell by absorbing the liquid and a substrate that supports the absorbent resins and allows the liquid to permeate therethrough. With the absorbent resins swelling by absorbing the ink, at least some of the absorbent resins are spaced apart from the adjacent absorbent resins.

7 Claims, 21 Drawing Sheets

LIQUID CONTAINER

The present application is based on, and claims priority from JP Application Serial Number 2019-222736, filed Dec. 10, 2019, the disclosure of which is hereby incorporated by reference herein in its entirety.

BACKGROUND

1. Technical Field

The present disclosure relates to a liquid container that stores an absorber configured to absorb liquid.

2. Related Art

Ink jet printers normally generate waste ink during head cleaning for preventing decreases in print quality caused by liquid (ink) clogging or during ink charging after ink cartridge exchange. To avoid accumulation of such waste ink in the internal system or the like, ink jet printers have a waste-ink collecting mechanism including an absorber (e.g., JP-A-2003-80728) for absorbing waste ink. The absorber described in JP-A-2003-80728 is a nonwoven fabric made of synthetic fiber.

However, when the absorber described in JP-A-2003-80728 is used in a liquid container for collecting waste ink, the absorber described in JP-A-2003-80728 has a room for improvement in holding the absorbed ink, and the ink may leak out after being absorbed by the absorber.

SUMMARY

A liquid container includes: a case having a liquid introduction port through which liquid is introduced and a storage portion that stores the liquid; and an absorber stored in the case and configured to absorb the liquid. The absorber includes multiple absorbent resins that swell by absorbing the liquid and a substrate that supports the absorbent resins and allows the liquid to permeate therethrough. With the absorbent resins swelling by absorbing the liquid, at least some of the absorbent resins are spaced apart from the adjacent absorbent resins.

A liquid container includes: a case having a liquid introduction port through which liquid is introduced and a storage portion that stores the liquid; and an absorber stored in the case and configured to absorb the liquid. The absorber includes: a first resin group in which multiple absorbent resins that swell by absorbing the liquid are arranged in a line in a first direction; a second resin group in which multiple absorbent resins that swell by absorbing the liquid are arranged in a line in the first direction with a space between the second resin group and the first resin group; and a substrate that supports the first resin group and the second resin group and allows the liquid to permeate therethrough. With the absorbent resins swelling by absorbing the liquid, at least some of the absorbent resins of the first resin group are spaced apart from the absorbent resins of the second resin group.

A liquid container includes: a case having a liquid introduction port through which liquid is introduced and a storage portion that stores the liquid; and an absorber stored in the case and configured to absorb the liquid. The absorber includes: a first ring-shaped resin group in which multiple absorbent resins that swell by absorbing the liquid are arranged in a ring shape; a second ring-shaped resin group in which multiple absorbent resins that swell by absorbing the liquid are arranged in a ring shape with a space between the second ring-shaped resin group and the first ring-shaped resin group; and a substrate that supports the first ring-shaped resin group and the second ring-shaped resin group and that allows the liquid to permeate therethrough. With the absorbent resins swelling by absorbing the liquid, at least some of the absorbent resins of the first ring-shaped resin group are spaced apart from the absorbent resins of the second ring-shaped resin group.

DESCRIPTION OF EXEMPLARY EMBODIMENTS

1. First Embodiment 1.1 Overview of Printing Apparatus

Figure 1:
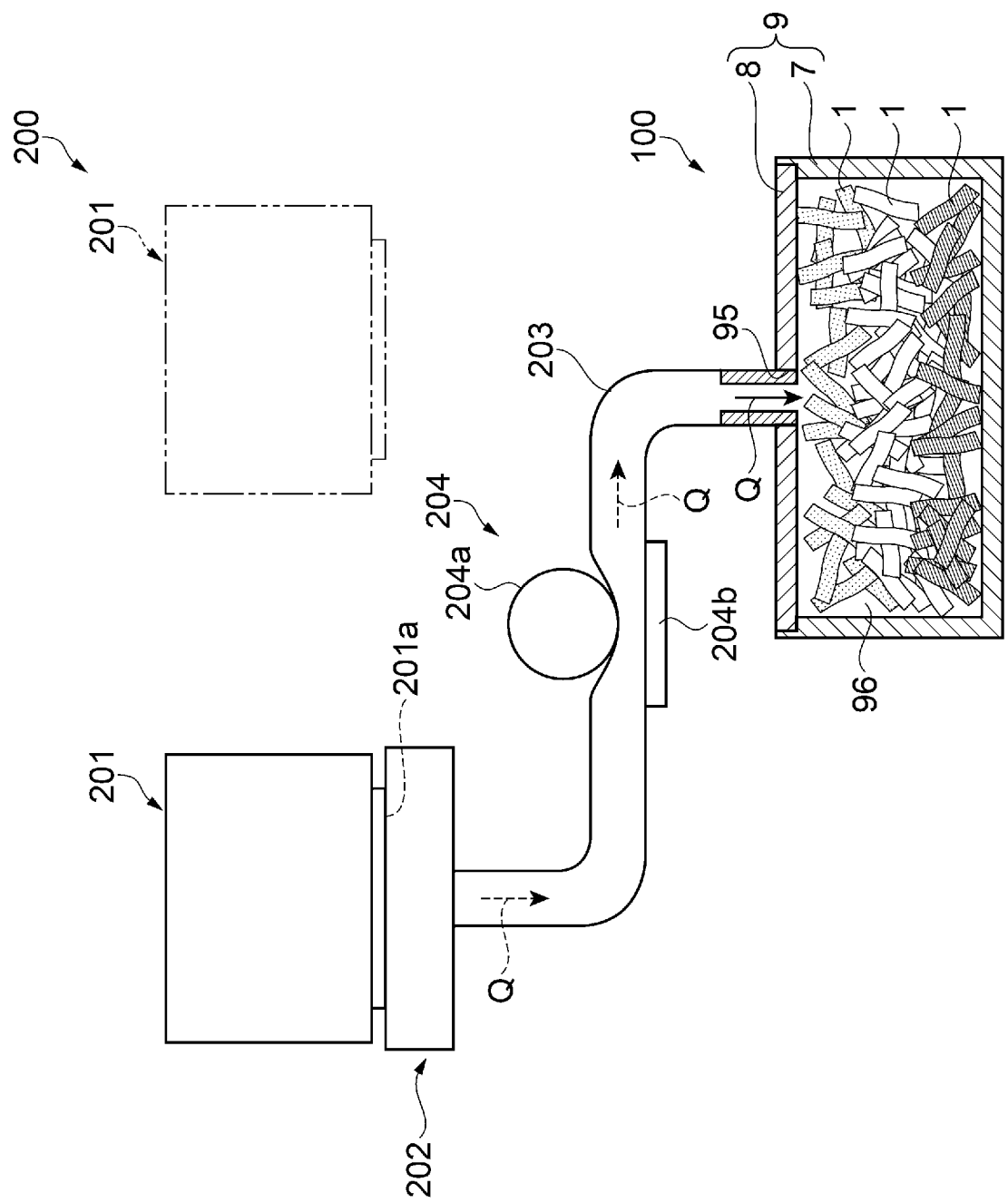
FIG. 1 is a schematic view of a printing apparatus having a liquid container according to a first embodiment.

As illustrated in FIG. 1, a printing apparatus 200 is an ink jet color printer. The printing apparatus 200 includes an ink ejecting head 201 which ejects an ink Q, a capping unit 202 which prevents clogging of nozzles 201a of the ink ejecting head 201, a liquid container 100 according to this embodiment, and a tube 203 which connects the capping unit 202 and the liquid container 100. The ink Q is an example liquid in this specification.

The ink ejecting head 201 has multiple nozzles 201a from which the ink Q is ejected downward. As indicated by solid lines and long dashed double-dotted lines in the figure, the ink ejecting head 201 ejects the ink Q while moving relative to a recording medium (not illustrated), such as a PPC sheet, whereby printing can be performed on the recording medium.

When the ink ejecting head 201 is in the standby position indicated by the solid lines in FIG. 1, the capping unit 202 sucks the nozzles 201a collectively by means of the operation of a roller pump 204 and prevents, for example, clogging of the nozzles 201a. The tube 203 has flexibility and forms an ink flow path through which the ink Q sucked via the capping unit 202 is discharged into the liquid container 100.

The roller pump 204 is disposed in the middle of the tube 203 and includes a roller unit 204a and a holding unit 204b which holds the tube 203 between the holding unit 204b and the roller unit 204a. As the roller unit 204a rotates, a suction force is generated in the capping unit 202 via the tube 203. As the roller unit 204a continuously rotates, the ink Q sucked from the nozzles 201a can be fed to the liquid container 100. The ink Q sucked via the capping unit 202 is collected as waste liquid in the liquid container 100.

The liquid container 100 includes an absorber 1 configured to absorb the ink Q and a case 9 which stores the absorber 1. The case 9 has a container 7 and a lid 8 which tightly seals the container 7. The lid 8 has a connection port 95 in a central portion. The tube 203 is connected to the lid 8 through the connection port 95. The connection port 95 is a through-hole that passes through the lid 8 in the thickness direction. The space defined by the container 7 and the lid 8 is a storage space 96 in which absorbers 1 are stored. In the storage space 96 of the case 9, multiple (many) absorbers 1 in the form of small pieces obtained by shredding with a shredder or the like are stored. The ink Q is introduced into the storage space 96 of the liquid container 100 through the connection port 95 and absorbed by the absorbers 1 stored in the storage space 96. The connection port 95 is an example liquid introduction port in this specification, and the storage space 96 is an example storage portion in this specification.

As described above, the liquid container 100 includes the case 9 having a liquid introduction port (connection port 95) through which the ink Q is introduced and a storage portion (storage space 96) that stores the ink Q. The liquid container 100 further includes multiple absorbers 1 stored in the case 9 and configured to absorb the ink Q. In the following description, among the absorbers 1 stored in the storage space 96, absorbers 1 disposed near the connection port 95 are referred to as upper absorbers 1, absorbers 1 disposed away from the connection port 95 as lower absorbers 1, and absorbers 1 disposed between the upper absorbers 1 and the lower absorbers 1 as middle absorbers 1. In the storage space 96 of the case 9, a section where the upper absorbers 1 are disposed is referred to as an upper side, and a section where the lower absorbers 1 are disposed is referred to as a lower side. In FIG. 1, the upper absorbers 1 are shaded, and the lower absorbers 1 are hatched. In FIG. 1, the middle absorbers 1 are shown in solid white.

The liquid container 100 is what is called a waste liquid tank and detachably attached to the printing apparatus 200. When the amount of ink Q absorbed by the liquid container 100 reaches the limit, the liquid container 100 in which the amount of ink Q absorption reaches the limit can be replaced with an unused or new liquid container 100. In this embodiment, whether the amount of ink Q absorbed by the liquid container 100 has reached the limit is detected by a detector (not illustrated) in the printing apparatus 200. Specifically, the detector integrates the amount of ink ejected from the ink ejecting head 201 and detects whether the amount of ink Q absorbed by the liquid container 100 has reached the limit from the integrated amount of ejected ink. When the amount of ink Q absorbed by the liquid container 100 reaches the limit, a notification portion (not illustrated), such as a monitor, gives notice that the amount of ink Q absorbed by the liquid container 100 has reached the limit. The notice of the notification portion allows the user to know that the amount of ink Q absorbed by the liquid container 100 has reached the limit, and the user replaces the liquid container 100 absorbing the ink Q with a new liquid container 100.

1.2 Overview of Absorber

Figure 2:
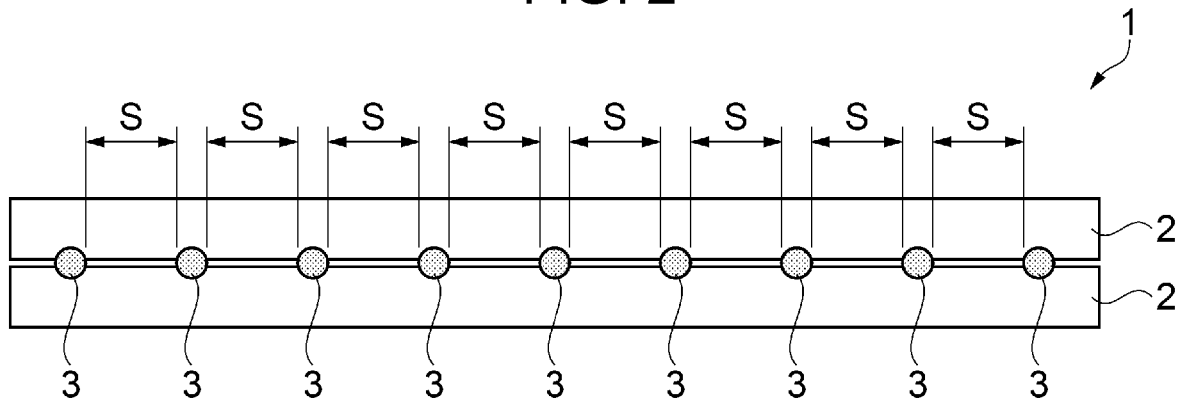
FIG. 2 is a schematic sectional view of an absorber according to the first embodiment.
Figure 3:
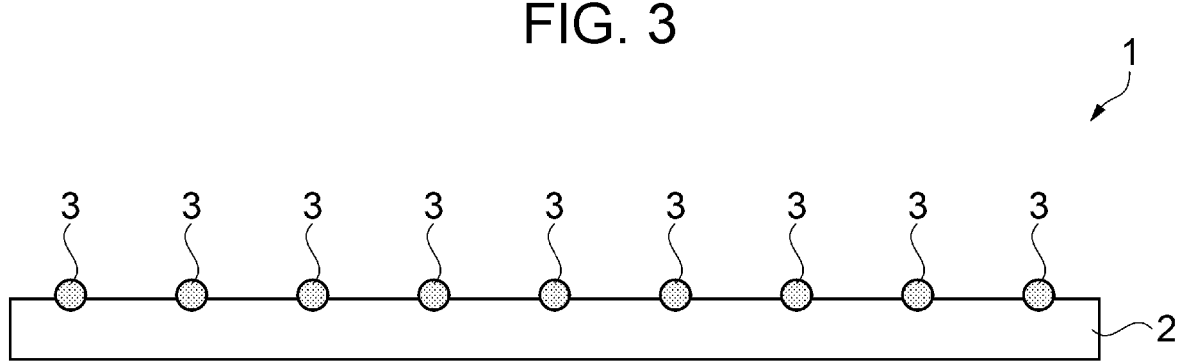
FIG. 3 is a schematic sectional view of another absorber.
Figure 4:
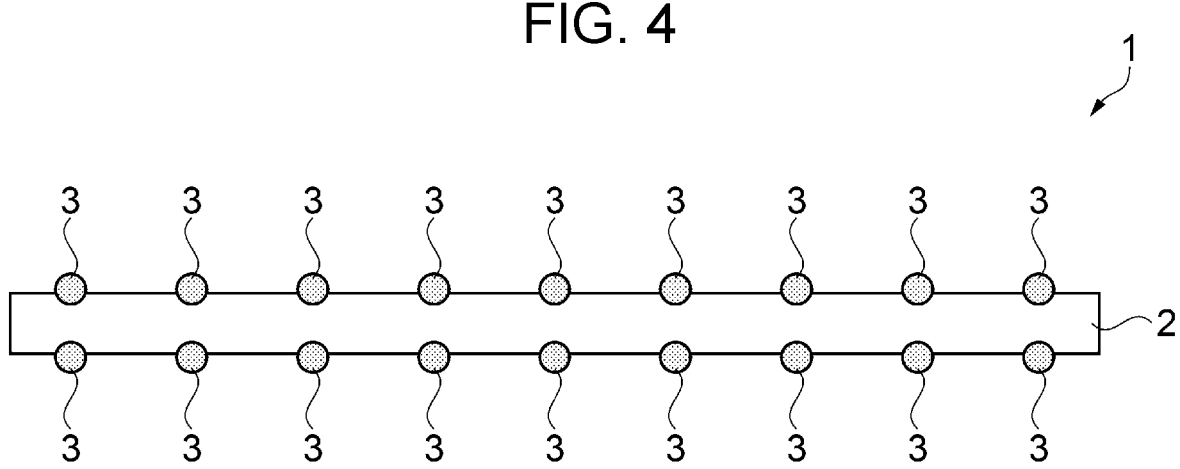
FIG. 4 is a schematic sectional view of still another absorber.

As illustrated in FIG. 2, the absorber 1 includes a substrate 2 and absorbent resins 3 carried (supported) on the substrate 2. In this embodiment, the absorber 1 has a structure in which the absorbent resins 3 are sandwiched between a pair of substrates 2. The absorber 1 may have a structure in which the absorbent resins 3 are supported on one surface of the substrate 2 as illustrated in FIG. 3, or may have a structure in which the absorbent resins 3 are supported on both surfaces of the substrate 2 as illustrated in FIG. 4. Since the absorbent resins 3 are sandwiched between a pair of the substrates 2 in this embodiment, the absorbent resins 3 are unlikely to fall out of the substrates 2 compared with the case in which the absorbent resins 3 are not sandwiched between the substrates 2 (the structure illustrated in FIG. 3 or FIG. 4). This structure allows the absorber 1 to maintain good ink Q absorption properties for a long period of time, and the liquid container 100 storing the absorber 1 can thus absorb and hold the ink Q for a long period of time.

The substrate 2 is a fiber assembly, and the ink Q permeates the substrate 2. Examples of the fiber that constitutes the substrate 2 include fibers made of petroleum-derived materials, such as polyester fibers and polyamide fibers; and fibers made of naturally occurring materials, such as cellulose fibers, keratin fibers, and fibroin fibers. The fiber that constitutes the substrate 2 may be one of these fibers or may be a mixture of these fibers.

In this embodiment, cellulose fibers are used as the fiber that constitutes the substrate 2. Since cellulose fibers can be made by recycling used paper, cellulose fibers are advantageous in, for example, reduction of waste and effective use of resources. The substrate 2 made by recycling used paper is cheaper than the absorbent resins 3 and advantageous in reduction of costs for manufacturing the absorber 1. In addition, cellulose fibers are biodegradable and can be microbially degraded into low-molecular weight compounds that do not adversely affect the environment. When cellulose fibers, which can be microbially degraded into low-molecular weight compounds that do not adversely affect the environment, are used as the fiber that constitutes the substrate 2, the environmental burden can be reduced compared with the case of using fibers made of petroleum-derived materials which are difficult to microbially degrade.

The cellulose that constitutes the cellulose fiber is a linear polymer compound and has hydroxyl groups at terminals. A cellulose fiber is, for example, an assembly of celluloses bonded to each other through hydrogen bonds and has voids inside. The substrate 2 made of cellulose fiber thus has voids inside and allows the ink Q to permeate therethrough. The substrate 2 made of cellulose fiber deforms under external force.

Figure 5:
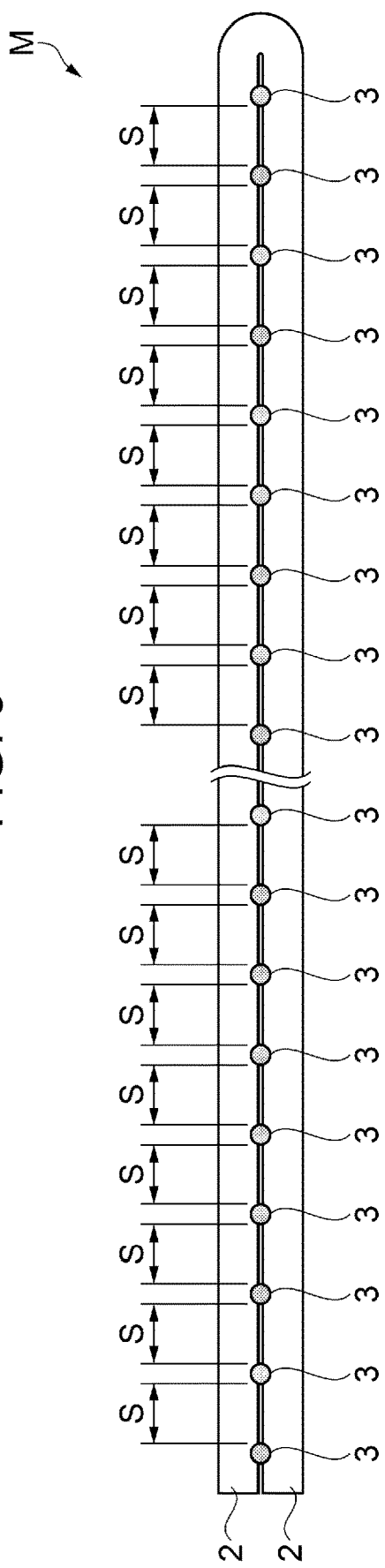
FIG. 5 is a schematic sectional view of a large sheet.

The absorber 1 is prepared by shredding a large sheet M (large substrate 2) having the absorbent resins 3 supported thereon into small pieces with scissors, a cutter, a mill, a shredder, or the like. Specifically, a large sheet M having the absorbent resins 3 supported thereon is prepared by spraying the absorbent resins 3 onto the large sheet M to which water, PVA, and glue have been applied in advance. Subsequently, the large sheet M having the absorbent resins 3 supported thereon is fold and pressed to form the large sheet M having a structure in which the absorbent resins 3 are sandwiched between a pair of the substrates 2 as illustrated in FIG. 5. When the large sheet M having the absorbent resins 3 supported thereon is fold and pressed, the substrate 2 that constitutes the large sheet M deforms, and the absorbent resins 3 are digging into the substrate 2 and firmly supported by the substrate 2, which makes it difficult for the absorbent resins 3 to fall out of the substrate 2. Next, the large sheet M is shredded into small pieces with scissors, a cutter, a mill, a shredder, or the like to form the absorber 1 having a structure in which the absorbent resins 3 are sandwiched between a pair of the substrates 2.

The proportion of the absorbent resins 3 supported on the substrate 2 is not limited and, for example, the absorbent resins 3 may be set in the range of 0.04 g or more and 0.12 g or less when the substrate 2 is in the range of more than 0 g and 0.24 g or less. As the proportion of the absorbent resins 3 supported on the substrate 2 increases, the density of the absorbent resins 3 supported on the substrate 2 increases. As the proportion of the absorbent resins 3 supported on the substrate 2 decreases, the density of the absorbent resins 3 supported on the substrate 2 decreases. In other words, the density of the absorbent resins 3 supported on the substrate 2 can be controlled by controlling the proportion of the absorbent resins 3 supported on the substrate 2.

The absorbent resin 3 is any resin capable of absorbing the ink Q. Examples of the absorbent resin 3 include carboxymethyl cellulose, polyacrylic acid, polyacrylamide, starch-acrylic acid graft copolymer, hydrolyzed starch-acrylonitrile graft copolymer, vinyl acetate-acrylic acid ester copolymer, isobutylene-maleic acid copolymer, hydrolyzed acrylonitrile copolymers or hydrolyzed acrylamide copolymers, polyethylene oxide, polysulfonic acid compounds, polyglutamic acid, salts (neutralized products) thereof, and cross-linked products thereof.

The absorbent resin 3 has a three-dimensional network structure of cross-linked polymers, and the ink Q is incorporated in the three-dimensional network structure. With this structure, the absorbent resin 3 swells when the absorbent resin 3 absorbs the ink Q. The absorbent resin 3 swelling by absorbing the ink Q is a deformable and flexible polymer gel and stably holds the ink Q. For example, a nonwoven fabric made of synthetic fiber has voids inside, and the ink Q is incorporated in the voids. The ink Q incorporated in the voids is more weakly held by the nonwoven fabric and more easily released to the outside than the ink Q incorporated in the three-dimensional network structure of the absorbent resin 3. The ink Q incorporated in the three-dimensional network structure of the absorbent resin 3 is more strongly held by the absorber 1 and more rarely released to the outside than the ink Q incorporated in the voids. Once the ink Q is incorporated into the absorbent resin 3, the absorbent resin 3 can stably hold the ink Q.

The absorbent resin 3 may be in any form, such as a scale form, a needle form, a fiber form, or a particle form. In this embodiment, the absorbent resin 3 in a particle form is used. When the absorbent resin 3 in a particle form is used, the average particle size of the particles is preferably 15 µm or more and 800 µm or less, more preferably 15 µm or more and 400 µm or less, and still more preferably 15 µm or more and 50 µm or less. In this embodiment, the absorbent resin 3 having an average particle size of about 30 µm is used. For example, when the absorbent resin 3 having an average particle size of about 30 µm absorbs the ink Q, the average particle size expands to about 150 µm to 180 µm. In other words, when the absorbent resin 3 absorbs the ink Q, the average particle size of the absorbent resin 3 expands by about 5 to 6 times.

FIG. 2 to FIG. 5 are views of the absorbent resins 3 before the absorbent resins 3 absorb the ink Q, and the absorbent resins 3 do not absorb the ink Q or swell. As illustrated in FIG. 2, the absorbent resins 3 are spaced apart from the adjacent absorbent resins 3 with the absorbent resins 3 not absorbing the ink Q or swelling. Spaces S are thus provided between the absorbent resins 3 and the adjacent absorbent resins 3.

Figure 6:
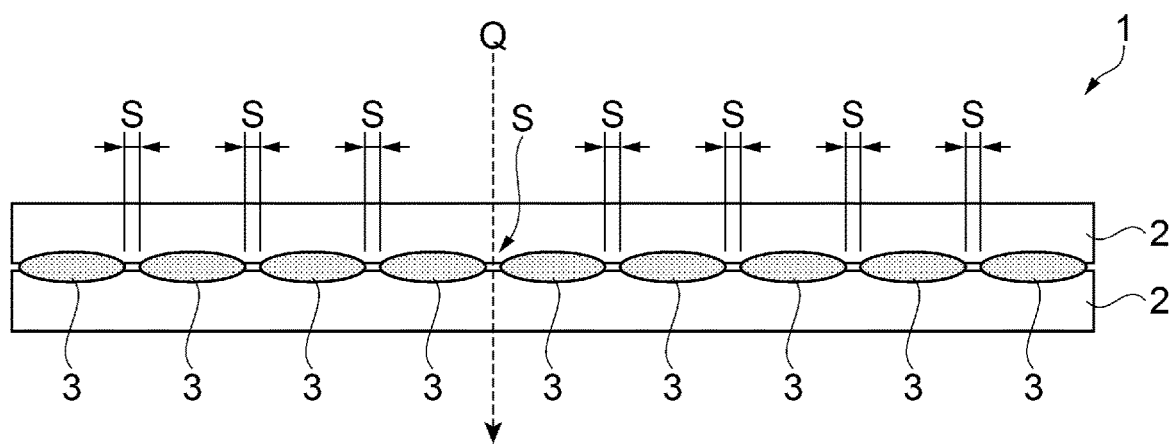
FIG. 6 is a schematic sectional view of an absorber after the absorber absorbs ink.
Figure 7:
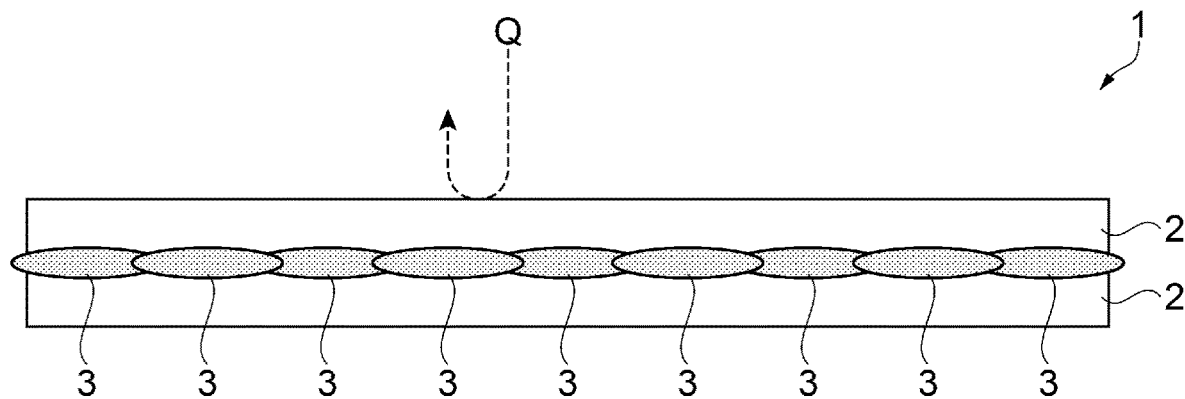
FIG. 7 is another schematic sectional view of the absorber after the absorber absorbs ink.

FIG. 6 and FIG. 7 are views of the absorbent resins 3 after the absorbent resins 3 absorb the ink Q, and the absorbent resins 3 swell by absorbing the ink Q. As illustrated in FIG. 6, the absorbent resins 3 are spaced apart from the adjacent absorbent resins 3 with the absorbent resins 3 swelling by absorbing the ink Q. The spaces S are thus provided between the absorbent resins 3 and the adjacent absorbent resins 3, and the spaces S are not closed. The spaces S between the absorbent resins 3 and the adjacent absorbent resins 3 function as flow paths for the ink Q. As indicated by the dashed arrow in the figure, the ink Q passes through a space S of the absorber 1 and flows from one surface of the absorber 1 to the other surface of the absorber 1. In this embodiment, the absorber 1 thus does not inhibit the flow of the ink Q even when the absorbent resins 3 swell by absorbing the ink Q.

However, when the density of the absorbent resins 3 on the substrates 2 is high, as illustrated in FIG. 7, the absorbent resins 3 are in contact with the adjacent absorbent resins 3 with the absorbent resins 3 swelling by absorbing the ink Q, and the spaces 3 between the absorbent resins 3 and the adjacent absorbent resins 3 are closed. Specifically, since the absorbent resins 3 swelling by absorbing the ink Q are composed of a deformable polymer gel, the absorbent resins 3 swell so as to fill into the spaces S between the absorbent resins 3 and the adjacent absorbent resins 3 when the absorbent resins 3 swell by absorbing the ink Q, and the spaces S between the absorbent resins 3 and the adjacent absorbent resins 3 are closed. Since the flow paths (spaces S) for the ink Q in the absorber 1 are closed, the absorber 1 inhibits the flow of the ink Q, and the ink Q does not flow from one surface of the absorber 1 to the other surface of the absorber 1.

Returning to FIG. 1, the ink Q introduced through the connection port 95 flows from the upper absorbers 1 shaded in the figure toward the lower absorbers 1 hatched in the figure. The ink Q introduced through the connection port 95 is first absorbed by the upper absorbers 1, next absorbed by the middle absorbers 1, and finally absorbed by the lower absorbers 1. Since the ink Q first flows into the upper absorbers 1, the amount of ink Q absorbed by the upper absorbers 1 tends to reach the limit more quickly than that absorbed by other absorbers 1. If the amount of ink Q absorbed by the upper absorbers 1 reaches the limit, and the absorbent resins 3 of the upper absorbers 1 swell to close flow paths (spaces S) for the ink Q, the ink Q introduced through the connection port 95 does not flow toward the middle absorbers 1 or the lower absorbers 1 and thus is not absorbed by the middle absorbers 1 or the lower absorbers 1. In this case, the amount of ink Q absorbed by the liquid container 100 is low, which generates a problem of failure to achieve the amount of ink Q absorption required for the liquid container 100.

As described above, the detector of the printing apparatus 200 integrates the amount of ink ejected from the ink ejecting head 201 and detects whether the amount of ink Q absorbed by the liquid container 100 has reached the limit from the integrated amount of ink. If the amount of ink Q absorbed by the upper absorbers 1 reaches the limit, and the ink Q introduced through the connection port 95 does not flow toward the middle absorbers 1 or the lower absorbers 1, the detector does not determine that the amount of ink Q absorbed by the liquid container 100 has reached the limit, and the ink Q is continuously introduced into the liquid container 100 through the connection port 95. In this case, the flow of the ink Q introduced through the connection port 95 is inhibited by the upper absorbers 1 so that the ink Q does not flow toward the middle absorbers 1 or the lower absorbers 1, which generates a problem of leakage of the ink Q through the connection port 95.

In this embodiment, the spaces S serving as flow paths for the ink Q are not closed even if the amount of ink Q absorbed by the upper absorbers 1 reaches the limit and the absorbent resins 3 of the upper absorbers 1 swell. Thus, the ink Q introduced through the connection port 95 flows toward the middle absorbers 1 and the lower absorbers 1 and is absorbed by the middle absorbers 1 and the lower absorbers 1. In this embodiment, this feature avoids a problem in which the liquid container 100 does not absorb the ink Q before the amount of ink Q absorbed by the liquid container 100 reaches the limit. In other words, the liquid container 100 according to this embodiment is free from a problem of failure to achieve the required amount of ink Q absorption and a problem of leakage of the ink Q through the connection port 95.

Figure 8:
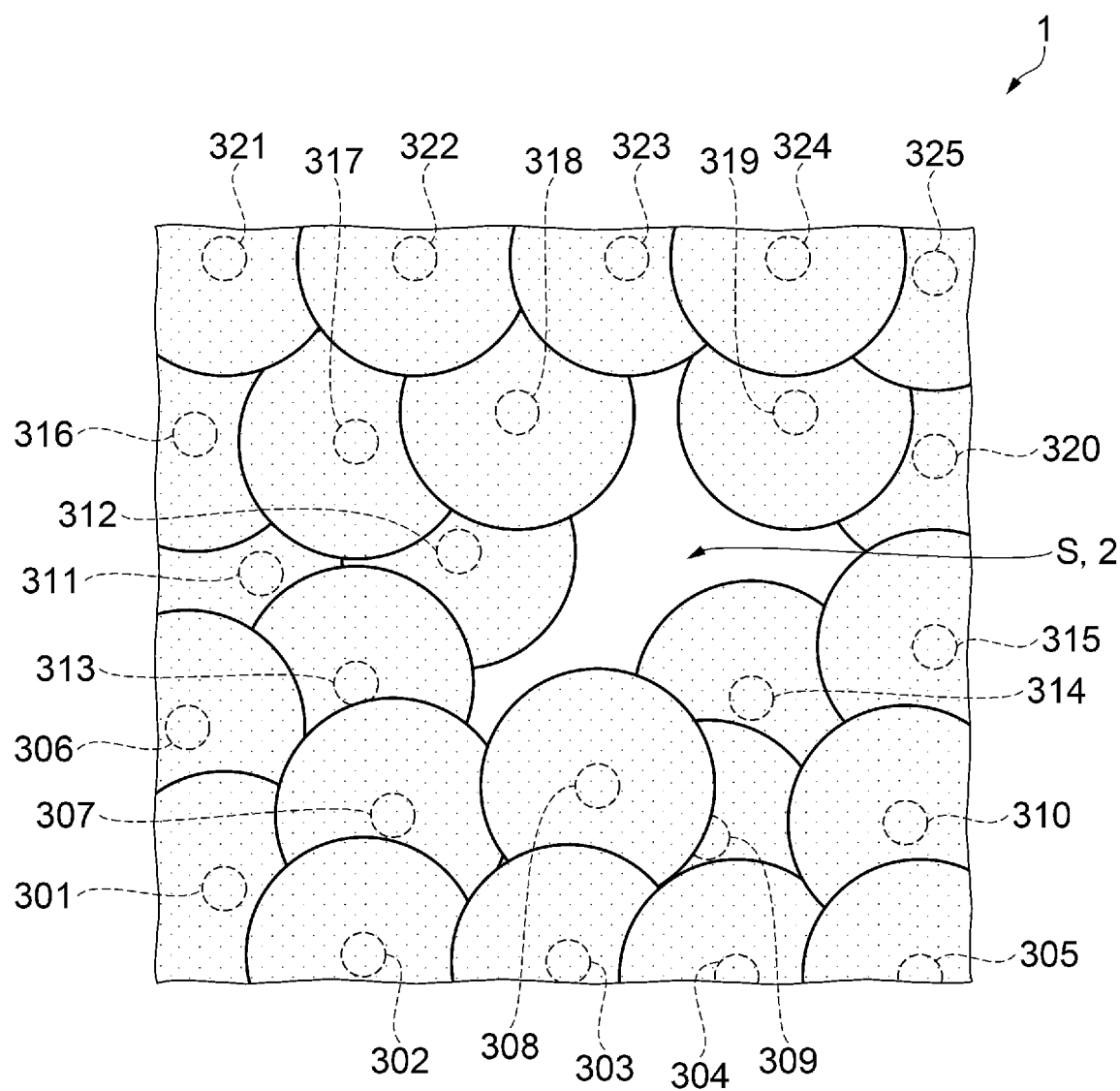
FIG. 8 is a schematic plan view of the absorber after the absorber absorbs ink.

FIG. 8 is a plan view of the absorbent resins 3. In FIG. 8, the absorbent resins 3 before absorbing the ink Q are shown in dashed lines, and the absorbent resins 3 after absorbing the ink Q are shown in solid lines. The absorbent resins 3 after absorbing the ink Q are shaded. In the following description, as illustrated in FIG. 8, the absorber 1 according to this embodiment includes a total of 25 absorbent resins 3 (absorbent resin 301 to absorbent resin 325).

As illustrated in FIG. 8, a total of 25 absorbent resins 3 which constitutes the absorber 1 includes, in order from the lower side in the figure, an absorbent resin 301, an absorbent resin 302, an absorbent resin 303, an absorbent resin 304, an absorbent resin 305, an absorbent resin 306, an absorbent resin 307, an absorbent resin 308, an absorbent resin 309, an absorbent resin 310, an absorbent resin 311, an absorbent resin 312, an absorbent resin 313, an absorbent resin 314, an absorbent resin 315, an absorbent resin 316, an absorbent resin 317, an absorbent resin 318, an absorbent resin 319, an absorbent resin 320, an absorbent resin 321, an absorbent resin 322, an absorbent resin 323, an absorbent resin 324, and an absorbent resin 325.

With the absorbent resins 3 swelling by absorbing the ink Q, a space S is formed by the absorbent resin 307, the absorbent resin 308, the absorbent resin 312, the absorbent resin 313, the absorbent resin 314, the absorbent resin 315, the absorbent resin 318, the absorbent resin 319, the absorbent resin 320, and the absorbent resin 323. With the absorbent resins 3 swelling by absorbing liquid (ink Q), the absorbent resins 3 that form the space S are absorbent resins 3 spaced apart from the adjacent absorbent resins 3. With regard to, for example, the absorbent resin 307, with the absorbent resins 3 swelling by absorbing the ink Q, the absorbent resin 308, the absorbent resin 312, the absorbent resin 313, the absorbent resin 314, the absorbent resin 315, the absorbent resin 318, the absorbent resin 319, the absorbent resin 320, and the absorbent resin 323 are disposed opposite the absorbent resin 307 across the space S and spaced apart from the absorbent resin 307. In other words, with regard to the absorbent resin 307, with the absorbent resins 3 swelling by absorbing the ink Q, the absorbent resin 308, the absorbent resin 312, the absorbent resin 313, the absorbent resin 314, the absorbent resin 315, the absorbent resin 318, the absorbent resin 319, the absorbent resin 320, and the absorbent resin 323 are adjacent to the absorbent resin 307 with the space S therebetween and spaced apart from the absorbent resin 307. Accordingly, with the absorbent resins 3 swelling by absorbing the ink Q, the absorbent resin 308, the absorbent resin 312, the absorbent resin 313, the absorbent resin 314, the absorbent resin 315, the absorbent resin 318, the absorbent resin 319, the absorbent resin 320, and the absorbent resin 323 are absorbent resins 3 spaced apart from the absorbent resin 307 and adjacent to the absorbent resin 307. With the absorbent resins 3 swelling by absorbing liquid (ink Q), the absorbent resin 307 forming the space S is an absorbent resin 3 spaced apart from the adjacent absorbent resins 3.

In the state illustrate in FIG. 8, the absorbent resin 307, the absorbent resin 308, the absorbent resin 312, the absorbent resin 313, the absorbent resin 314, the absorbent resin 315, the absorbent resin 318, the absorbent resin 319, the absorbent resin 320, and the absorbent resin 323 are absorbent resins 3 forming the space S, are absorbent resins 3 spaced apart from the adjacent absorbent resins 3 with the absorbent resins 3 swelling by absorbing the ink Q, and correspond to absorbent resins spaced apart from the adjacent absorbent resins in this specification. In the state illustrate in FIG. 8, the number of absorbent resins spaced apart from the adjacent absorbent resins in this specification is 10. In the liquid container 100 according to this embodiment, at least some of the absorbent resins 3 are spaced apart from the adjacent absorbent resins 3, with the absorbent resins 3 swelling by absorbing liquid (ink Q).

With the absorbent resins 3 swelling by absorbing the ink Q, the absorbent resins 3 that do not form the space S are absorbent resins 3 in contact with the adjacent absorbent resins 3. With regard to, for example, the absorbent resin 309 which does not form the space S, with the absorbent resins 3 swelling by absorbing the ink Q, the absorbent resin 303, the absorbent resin 304, the absorbent resin 308, the absorbent resin 310, the absorbent resin 314 are adjacent to the absorbent resin 309 and in contact with the absorbent resin 309. In other words, the absorbent resins 303, 304, 308, 310, and 314 adjacent to the absorbent resin 309 are all in contact with the absorbent resin 309 with the absorbent resins 3 swelling by absorbing the ink Q. In the state illustrate in FIG. 8, the absorbent resin 301, the absorbent resin 302, the absorbent resin 303, the absorbent resin 304, the absorbent resin 305, the absorbent resin 306, the absorbent resin 309, the absorbent resin 310, the absorbent resin 311, the absorbent resin 316, the absorbent resin 317, the absorbent resin 321, the absorbent resin 322, the absorbent resin 324, and the absorbent resin 325 are absorbent resins 3 that do not form the space S and are absorbent resins 3 in contact with the adjacent absorbent resins 3 with the absorbent resins 3 swelling by absorbing the ink Q. In the state illustrated in FIG. 8, the number of absorbent resins 3 in contact with the adjacent absorbent resins 3 is 15, with the absorbent resins 3 swelling by absorbing the ink Q.

As described above, the absorbent resin 307, the absorbent resin 308, the absorbent resin 312, the absorbent resin 313, the absorbent resin 314, the absorbent resin 315, the absorbent resin 318, the absorbent resin 319, the absorbent resin 320, and the absorbent resin 323 are absorbent resins 3 spaced apart from the adjacent absorbent resins 3, and the number of absorbent resins spaced apart from the adjacent absorbent resins in this specification is 10, with the absorbent resins 3 swelling by absorbing the ink Q. In addition, the total number of absorbent resins 3 that constitute the absorber 1 is 25, and the number of absorbent resins in this specification is 25. In this case, with the absorbent resins 3 swelling by absorbing the ink Q, the proportion of the absorbent resins 3 spaced apart from the adjacent absorbent resins 3 with respect to the absorbent resins 3 supported on the substrate 2 is 10/25=40%.

As the proportion of the absorbent resins 3 spaced apart from the adjacent absorbent resins 3 with respect to the absorbent resins 3 supported on the substrate 2 with the absorbent resins 3 swelling by absorbing the ink Q increases, the spaces S serving as flow paths for the ink Q become wider, and it is easier for the ink Q to flow in the absorber 1. In this case, it is easy to avoid a problem of failure to achieve the required amount of ink Q absorption in the liquid container 100, and in addition, it is easy to avoid a problem of leakage of the ink Q through the connection port 95. As the proportion of the absorbent resins 3 spaced apart from the adjacent absorbent resins 3 with respect to the absorbent resins 3 supported on the substrate 2 with the absorbent resins 3 swelling by absorbing the ink Q decreases, the spaces S serving as flow paths for the ink Q become narrower, and it is more difficult for the ink Q to flow in the absorber 1. In this case, it is difficult to avoid a problem of failure to achieve the required amount of ink Q absorption in the liquid container 100, and in addition, it is difficult to avoid a problem of leakage of the ink Q through the connection port 95.

The studies carried out by the inventors of the present disclosure indicate that, when the proportion of the absorbent resins 3 spaced apart from the adjacent absorbent resins 3 with respect to the absorbent resins 3 supported on the substrate 2 with the absorbent resins 3 swelling by absorbing the ink Q is 10% or more and 100% or less, the liquid container 100 stably achieves the required amount of ink Q absorption and stably avoids a problem of leakage of the ink Q through the connection port 95. Therefore, the proportion of the absorbent resins 3 spaced apart from the adjacent absorbent resins 3 with respect to the absorbent resins 3 supported on the substrate 2 with the absorbent resins 3 swelling by absorbing the ink Q may be 10% or more and 100% or less.

As the proportion of the absorbent resins 3 spaced apart from the adjacent absorbent resins 3 with respect to the absorbent resins 3 supported on the substrate 2 with the absorbent resins 3 swelling by absorbing the ink Q decreases, the amount of the absorbent resins 3 supported on the substrate 2 increases, and the liquid container 100 can absorb more ink Q. In order for the liquid container 100 to absorb more ink Q, the proportion of the absorbent resins 3 spaced apart from the adjacent absorbent resins 3 with respect to the absorbent resins 3 supported on the substrate 2 with the absorbent resins 3 swelling by absorbing the ink Q may be smaller in the range of 10% or more and 100% or less.

As described above, the liquid container 100 according to this embodiment includes: the case 9 having the connection port 95 through which the ink Q is introduced and the storage space 96 which stores the ink Q; and the absorber 1 stored in the case 9 and configured to absorb the ink Q. The absorber 1 includes multiple absorbent resins 3 which swell by absorbing the ink Q, and the substrate 2 which supports the absorbent resins 3 and allows the ink Q to permeate therethrough. In addition, at least some of the absorbent resins 3 are spaced apart from the adjacent absorbent resins 3, with the absorbent resins 3 swelling by absorbing the ink Q. The liquid container 100 according to this embodiment which stores the absorber 1 having such a structure brings about effects of stably achieving the required amount of ink Q absorption and further stably avoiding a problem of leakage of the ink Q through the connection port 95.

2. Second Embodiment

Figure 9:
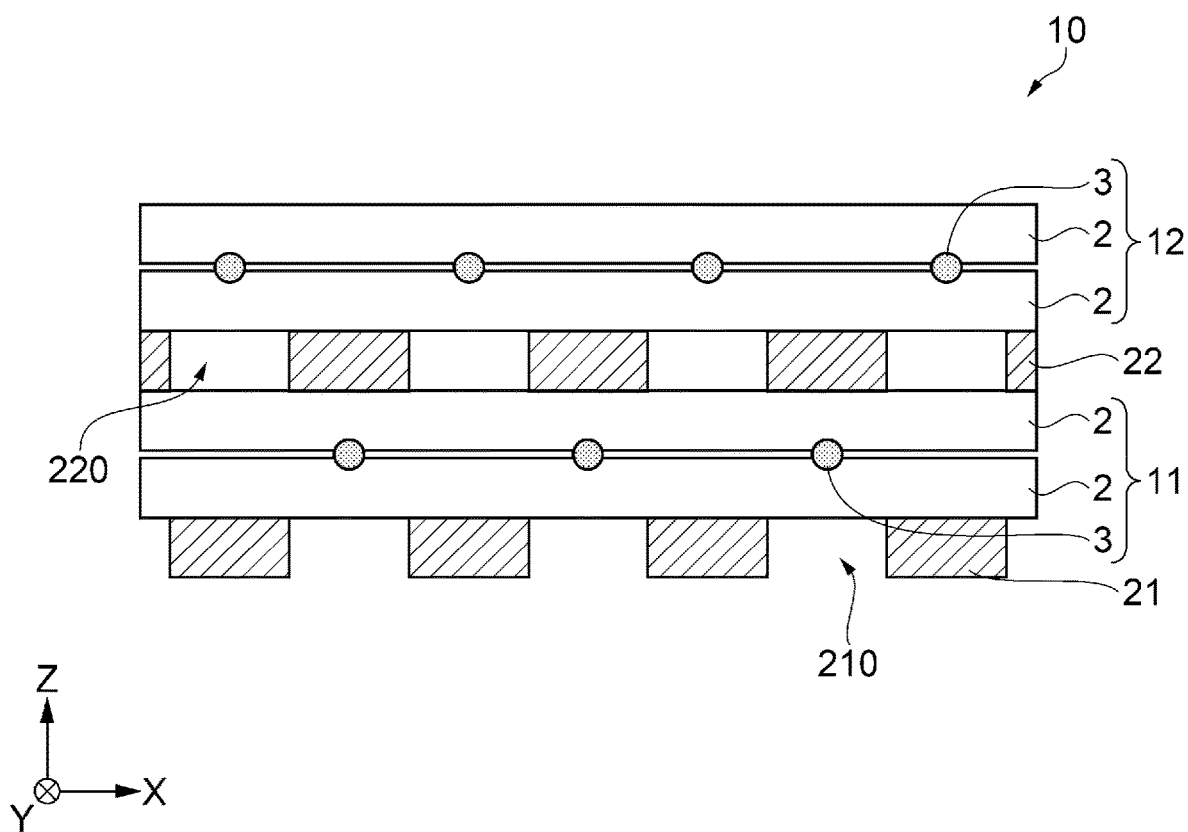
FIG. 9 is a schematic sectional view of an absorber having a multilayer structure according to a second embodiment.
Figure 10:
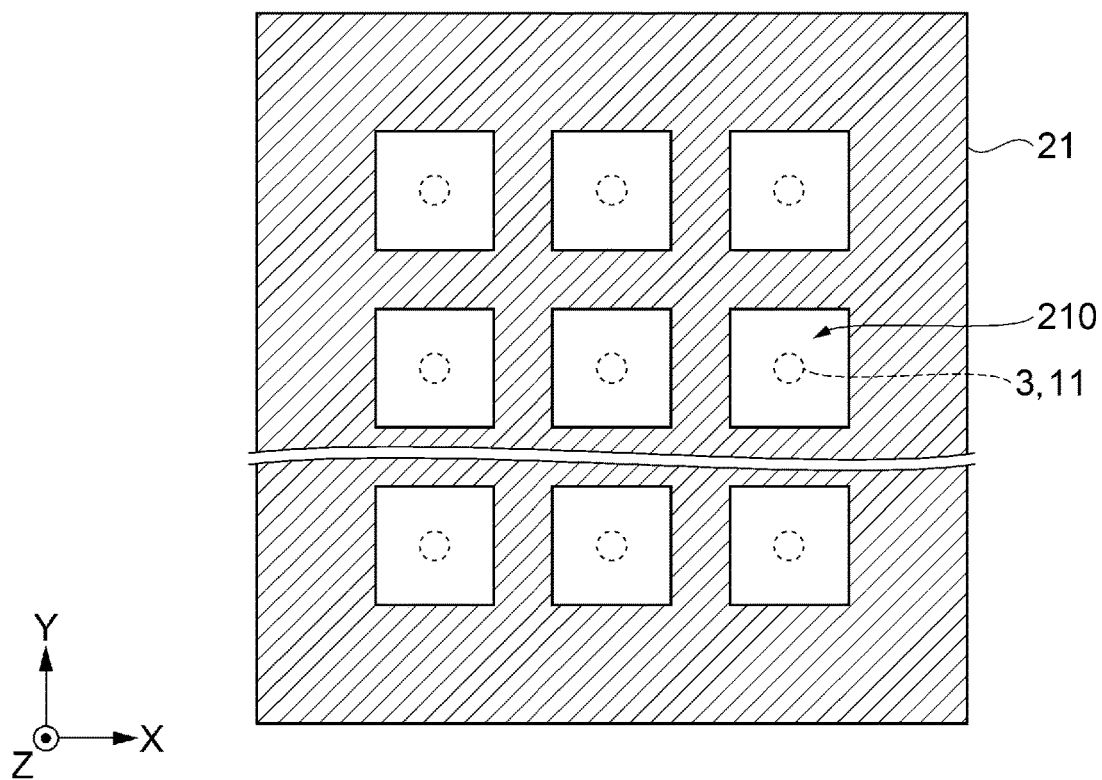
FIG. 10 is a schematic plan view of a first permeable member.
Figure 11:
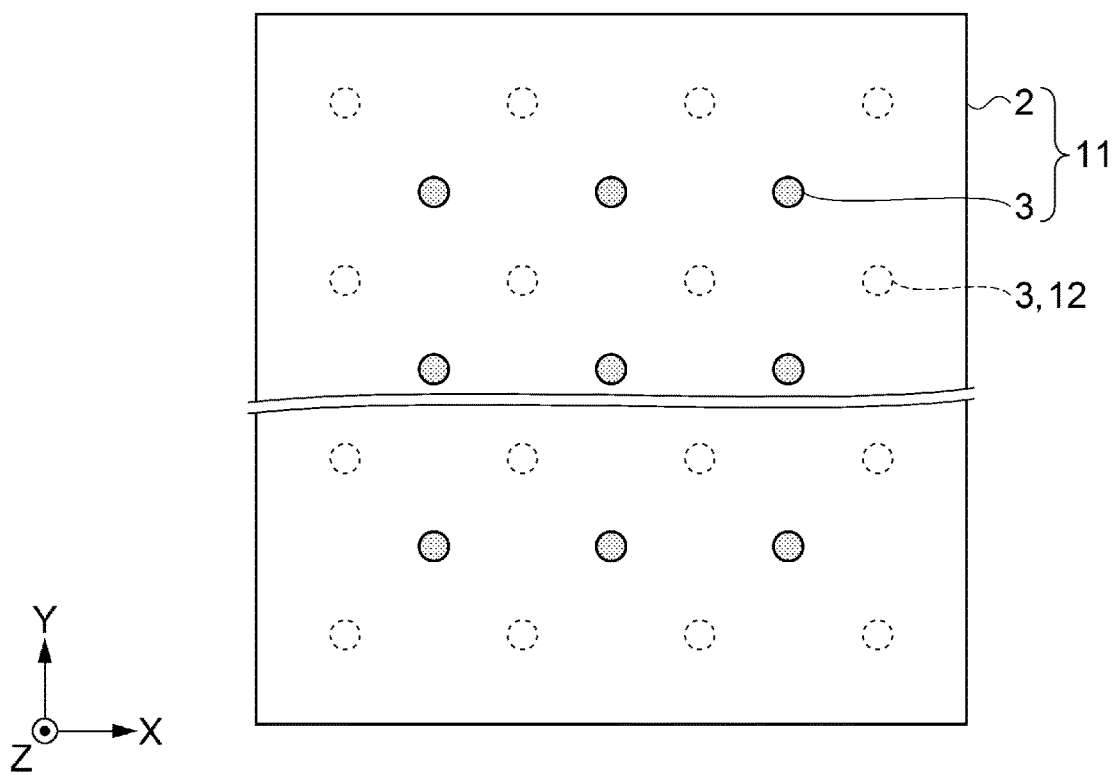
FIG. 11 is a schematic plan view of a first absorber.
Figure 12:
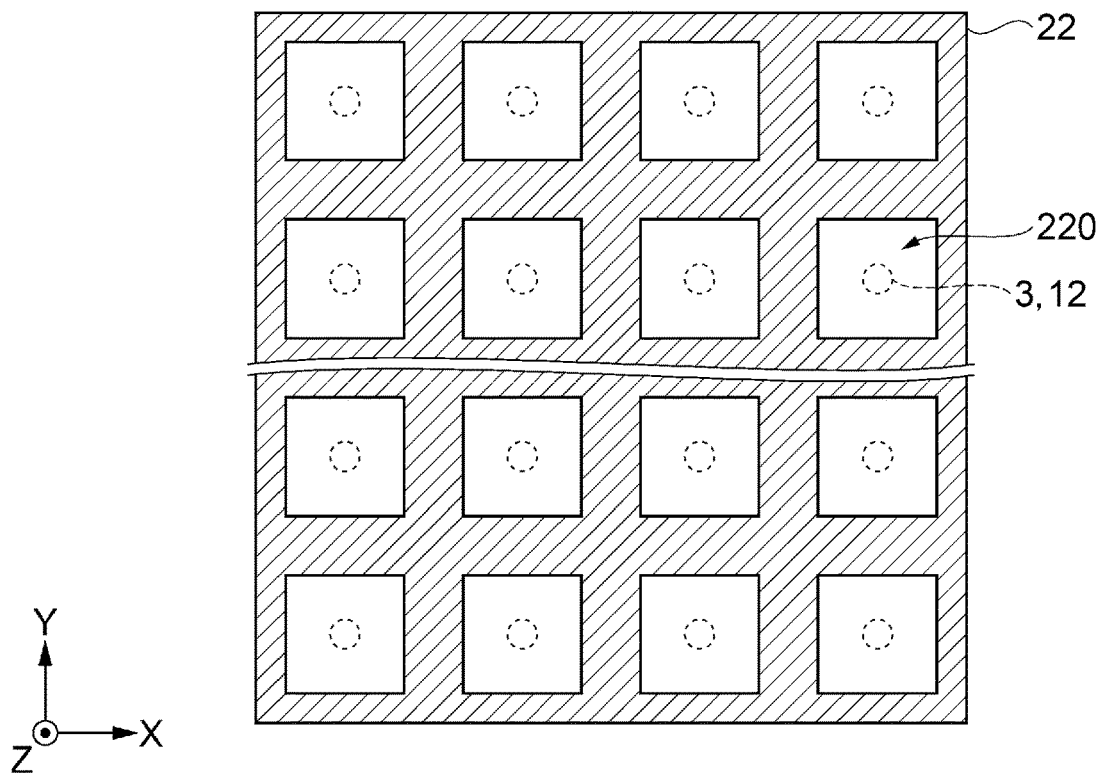
FIG. 12 is a schematic plan view of a second permeable member.
Figure 13:
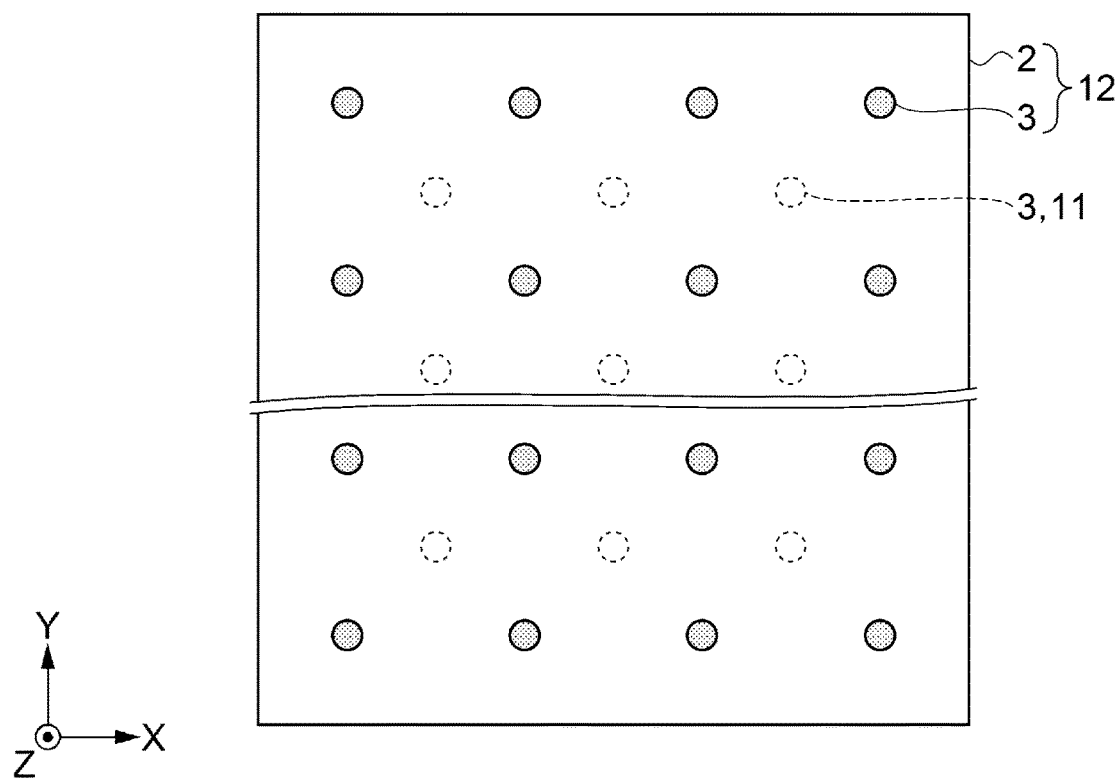
FIG. 13 is a schematic plan view of a second absorber.

FIG. 9 is a schematic sectional view of an absorber 10 having a multilayer structure. FIG. 10 is a schematic plan view of a first permeable member 21, which is a component of the absorber 10 having a multilayer structure. FIG. 11 is a schematic plan view of a first absorber 11, which is a component of the absorber 10 having a multilayer structure. FIG. 12 is a schematic plan view of a second permeable member 22, which is a component of the absorber 10 having a multilayer structure. FIG. 13 is a schematic plan view of a second absorber 12, which is a component of the absorber 10 having a multilayer structure. In FIG. 10 and FIG. 13, the absorbent resins 3 of the first absorber 11 are shown in dashed lines. In FIG. 11 and FIG. 12, the absorbent resins 3 of the second absorber 12 are shown in dashed lines. The absorber 10 having a multilayer structure in FIG. 9 is formed by staking the first permeable member 21 in FIG. 10, the first absorber 11 in FIG. 11, the second permeable member 22 in FIG. 12, and the second absorber 12 in FIG. 13 on top of one another. The absorbent resins 3 illustrated in FIG. 9 to FIG. 13 are not absorbing an ink Q or expanding. Referring to FIG. 9 to FIG. 13, the overview of the absorber 10 having a multilayer structure will be described below, mainly focusing on the differences from the first embodiment. The same components as those in the first embodiment are denoted by the same reference characters, and the overlapping description is omitted.

In the absorber 10 having a multilayer structure as illustrated in FIG. 9, the first permeable member 21, the first absorber 11, the second permeable member 22, and the second absorber 12 are stacked on top of one another in the Z direction, which is an example stacking direction, in a case 9 (not illustrated in FIG. 9). The absorbers 11 and 12 and the permeable members 21 and 22 have a rectangular shape long in one direction. In the following description, the transverse direction of the absorbers 11 and 12 and the permeable members 21 and 22, which intersects the Z direction which is an example stacking direction, is the X direction. The longitudinal direction of the absorbers 11 and 12 and the permeable members 21 and 22, which intersects the Z direction which is an example stacking direction, is the Y direction. The head side of the arrows indicating the directions is the positive direction, and the tail side of the arrows indicating the directions is the negative direction.

The first absorber 11 and the second absorber 12 have the same structure as the absorber 1 according to the first embodiment and each have a structure in which the absorbent resins 3 are sandwiched between a pair of substrates 2. In other words, the first absorber 11 and the second absorber 12 each have multiple absorbent resins 3. The absorbers 11 and 12 may have a structure in which the absorbent resins 3 are supported on one surface of the substrate 2 (see FIG. 3) or may have a structure in which the absorbent resins 3 are supported on both surfaces of the substrate 2 (see FIG. 4).

The first permeable member 21 and the second permeable member 22 are composed of a fiber assembly and allow the ink Q to permeate therethrough. In this embodiment, the first permeable member 21 and the second permeable member 22 are made of the same material as the substrate 2 according to the first embodiment. In other words, the first permeable member 21 and the second permeable member 22 are made of a cellulose fiber. The first permeable member 21 and the second permeable member 22 are made of a material through which the ink Q permeates. Examples of the material include, in addition to cellulose fibers, polyester fibers, polyamide fibers, keratin fibers, and fibroin fibers.

As illustrated in FIG. 9 and FIG. 10, the first permeable member 21 has multiple holes 210 penetrating the first permeable member 21 in the Z direction. The holes 210 are arranged in the X direction and the Y direction. In plan view in the Z direction, the absorbent resins 3 of the first absorber 11 are disposed inside the holes 210 of the first permeable member 21, and all the absorbent resins 3 of the first absorber 11 overlap the holes 210 of the first permeable member 21.

All the absorbent resins 3 of the first absorber 11 do not necessarily overlap the holes 210 of the first permeable member 21, and some of the absorbent resins 3 of the first absorber 11 may overlap the holes 210 of the first permeable member 21. In other words, in plan view in the Z direction, the absorbent resins 3 in the first absorber 11 and the holes 210 in the first permeable member 21 are positioned such that at least some of the absorbent resins 3 in the first absorber 11 overlap the holes 210 in the first permeable member 21. Specifically, the expression "at least some of the absorbent resins 3 overlap" in this specification means that 60% or more of the absorbent resins 3 of the first absorber 11 overlap the holes 210 of the first permeable member 21 in plan view in the Z direction. Thus, in plan view in the Z direction, 60% or more of the absorbent resins 3 in the first absorber 11 overlap any of the holes 210 in the first permeable member 21.

As illustrated in FIG. 9 and FIG. 12, the second permeable member 22 has multiple holes 220 penetrating the second permeable member 22 in the Z direction. The holes 220 are arranged in the X direction and the Y direction. In plan view in the Z direction, the absorbent resins 3 of the second absorber 12 are disposed inside the holes 220 of the second permeable member 22, and all the absorbent resins 3 of the second absorber 12 overlap the holes 220 of the second permeable member 22.

All the absorbent resins 3 of the second absorber 12 do not necessarily overlap the holes 220 of the second permeable member 22, and some of the absorbent resins 3 of the second absorber 12 may overlap the holes 220 of the second permeable member 22. In other words, in plan view in the Z direction, the absorbent resins 3 in the second absorber 12 and the holes 220 in the second permeable member 22 are positioned such that at least some of the absorbent resins 3 in the second absorber 12 overlap the holes 220 in the second permeable member 22. Specifically, 60% or more of the absorbent resins 3 in the second absorber 12 overlap any of the holes 220 in the second permeable member 22 in plan view in the Z direction.

In plan view in the Z direction, as illustrated FIG. 9, FIG. 11, and FIG. 13, the absorbent resins 3 in the first absorber 11 and the absorbent resins 3 in the second absorber 12 are respectively disposed in the absorbers 11 and 12 such that the absorbent resins 3 in the first absorber 11 do not overlap the absorbent resins 3 in the second absorber 12.

Since the holes 210 of the first permeable member 21 are disposed in the negative Z direction from the absorbent resins 3 of the first absorber 11, the absorbent resins 3 of the first absorber 11 tend to expand toward the holes 210 of the first permeable member 21 (in the negative Z direction) when the absorbent resins 3 of the first absorber 11 absorb the ink Q. In other words, the holes 210 in the first permeable member 21 ensure spaces for receiving the expanded absorbent resins 3 of the first absorber 11. As a result, the absorbent resins 3 are unlikely to come into contact with the adjacent absorbent resins 3 even when the absorbent resins 3 expand by absorbing the ink Q. Since the holes 210 of the first permeable member 21 serve as flow paths for the ink Q, the holes 210 in the first permeable member 21 facilitate the flow of the ink Q in the Z direction.

Since the holes 220 of the second permeable member 22 are disposed in the negative Z direction from the absorbent resins 3 of the second absorber 12, the absorbent resins 3 of the second absorber 12 tend to expand toward the holes 220 of the second permeable member 22 (in the negative Z direction) when the absorbent resins 3 of the second absorber 12 absorb the ink Q. In other words, the holes 220 in the second permeable member 22 ensure spaces for receiving the expanded absorbent resins 3 of the second absorber 12. As a result, the absorbent resins 3 are unlikely to come into contact with the adjacent absorbent resins 3 even when the absorbent resins 3 expand by absorbing the ink Q. Since the holes 220 of the second permeable member 22 serve as flow paths for the ink Q, the holes 220 in the second permeable member 22 facilitate the flow of the ink Q in the Z direction.

As described above, the liquid container according to this embodiment further includes the permeable members 21 and 22 which allow the ink Q to permeate therethrough. The absorbers 11 and 12 and the permeable members 21 and 22 are stacked on top of one another in the Z direction in the case 9. The permeable members 21 and 22 respectively have the holes 210 and 220 penetrating the permeable members 21 and 22 in the Z direction. In plan view in the Z direction, the absorbent resins 3 in the absorbers 11 and 12 and the holes 210 and 220 in the permeable members 21 and 22 are positioned such that at least some of the absorbent resins 3 in the absorbers 11 and 12 overlap the holes 210 and 220 in the permeable members 21 and 22. The liquid container according to this embodiment which stores the absorber 10 having a multilayer structure in which two absorbent resins 3 capable of absorbing the ink Q are disposed in the Z direction can absorb more ink Q than the liquid container 100 according to the first embodiment which stores the absorber 1 in which one absorbent resin 3 capable of absorbing the ink Q is disposed in the Z direction. Since the holes 210 and 220 of the permeable members 21 and 22 serve as flow paths for the ink Q and the ink Q easily flows in the Z direction in the absorber 10 having a multilayer structure, the liquid container according to this embodiment which stores the absorber 10 having a multilayer structure brings about effects of stably achieving the required amount of ink Q absorption and further stably avoiding a problem of leakage of the ink Q through the connection port 95, which are the same effects as in the first embodiment.

In this embodiment, the first permeable member 21, the first absorber 11, the second permeable member 22, and the second absorber 12 are stacked on top of one another in the Z direction. However, the absorber 10 is not limited to this structure, and for example, the first permeable member 21 and the first absorber 11 are stacked on top of each other in the Z direction.

3. Third Embodiment

Figure 14:
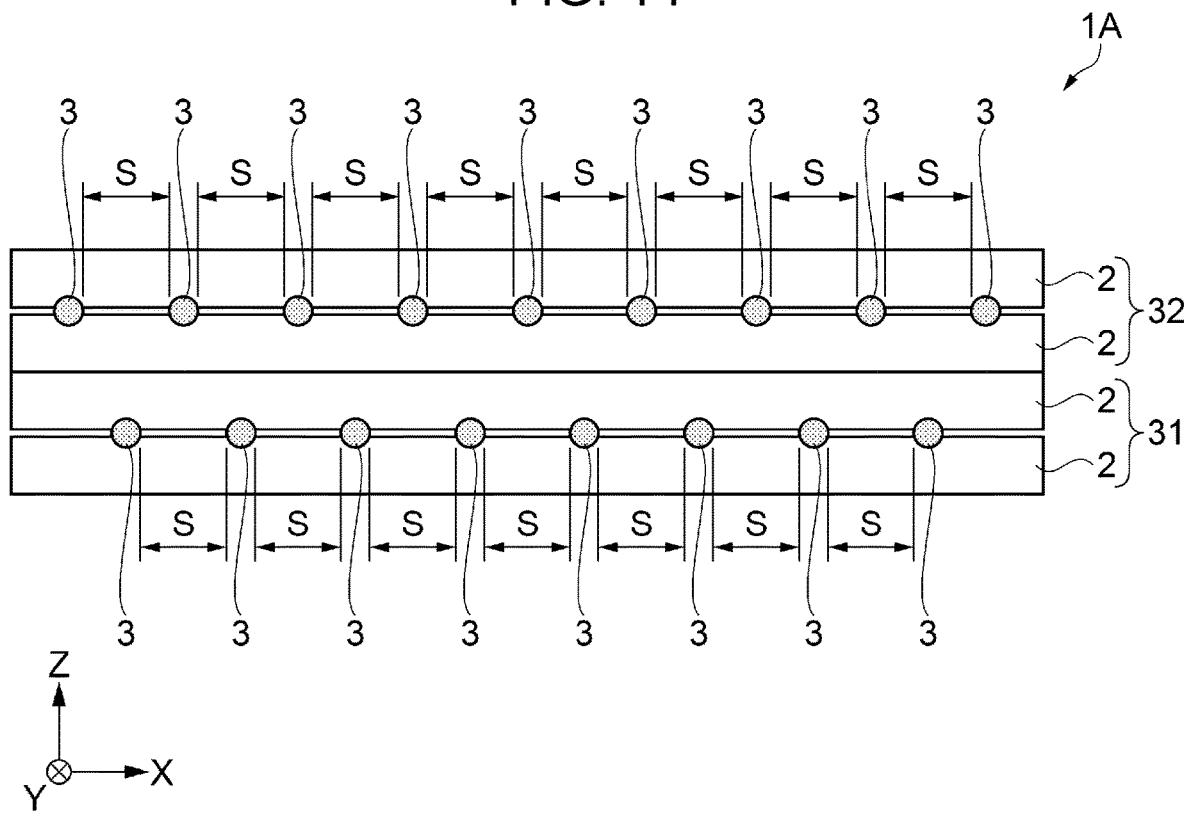
FIG. 14 is a schematic sectional view of an absorber according to a third embodiment.

FIG. 14 is a schematic sectional view of an absorber 1A according to a third embodiment. The absorbent resins 3 illustrated in FIG. 14 are not absorbing an ink Q or expanding. Referring to FIG. 14, the overview of the absorber 1A according to this embodiment will be described below, mainly focusing on the differences from the first embodiment. The same components as those in the first embodiment are denoted by the same reference characters, and the overlapping description is omitted.

In the absorber 1A according to the third embodiment, as illustrated in FIG. 14, a first substrate 31 having multiple absorbent resins 3 supported therein and a second substrate 32 having multiple absorbent resins 3 supported therein are stacked on top of each other in the Z direction. Specifically, the first substrate 31 having multiple absorbent resins 3 supported therein has the same structure as the absorber 1 according to the first embodiment and has a structure in which the absorbent resins 3 are sandwiched between a pair of substrates 2. Similarly, the second substrate 32 having multiple absorbent resins 3 supported therein has the same structure as the absorber 1 according to the first embodiment and has a structure in which the absorbent resins 3 are sandwiched between a pair of substrates 2. In the absorber 1A according to the third embodiment, the first substrate 31 having a structure in which the absorbent resins 3 are sandwiched between a pair of the substrates 2 and the second substrate 32 having a structure in which the absorbent resins 3 are sandwiched between a pair of the substrates 2 are stacked on top of each other in the Z direction.

In plan view in the Z direction, the absorbent resins 3 supported in the first substrate 31 and the absorbent resins 3 supported in the second substrate 32 are positioned such that the absorbent resins 3 supported in the first substrate 31 do not overlap the absorbent resins 3 supported in the second substrate 32. In other words, in plan view in the Z direction, the absorbent resins 3 are disposed in each of the first substrate 31 and the second substrate 32 such that the absorbent resins 3 of the first substrate 31 overlap spaces S of the second substrate 32 and the absorbent resins 3 of the second substrate 32 overlap spaces S of the first substrate 31.

In plan view in the Z direction, the absorbent resins 3 supported in the first substrate 31 and the absorbent resins 3 supported in the second substrate 32 may be positioned such that some of the absorbent resins 3 supported in the first substrate 31 do not overlap the absorbent resins 3 supported in the second substrate 32. In other words, in plan view in the Z direction, the absorbent resins 3 supported in the first substrate 31 and the absorbent resins 3 supported in the second substrate 32 may be positioned such that at least some of the absorbent resins 3 supported in the first substrate 31 do not overlap the absorbent resins 3 supported in the second substrate 32. The expression "at least some of the absorbent resins 3 do not overlap" in this specification means that, in plan view in the Z direction, 60% or more of the absorbent resins 3 supported in the first substrate 31 do not overlap the absorbent resins 3 supported in the second substrate 32, and 60% or more of the absorbent resins 3 supported in the second substrate 32 do not overlap the absorbent resins 3 supported in the first substrate 31.

In a case in which the absorbent resins 3 of the first substrate 31 overlap the spaces S of the second substrate 32 in plan view in the Z direction, the spaces S of the second substrate 32 ensure spaces for receiving the expanded absorbent resins 3 of the first substrate 31 when the absorbent resins 3 of the first substrate 31 swell by absorbing the ink Q. As a result, the absorbent resins 3 of the first substrate 31 are unlikely to come into contact with the adjacent absorbent resins 3 of the first substrate 31, which makes it difficult to close the spaces S which serve as flow paths for the ink Q. In a case in which the absorbent resins 3 of the second substrate 32 overlap the spaces S of the first substrate 31 in plan view in the Z direction, the spaces S of the first substrate 31 ensure spaces for receiving the expanded absorbent resins 3 of the second substrate 32 when the absorbent resins 3 of the second substrate 32 swell by absorbing the ink Q. As a result, the absorbent resins 3 of the second substrate 32 are unlikely to come into contact with the adjacent absorbent resins 3 of the second substrate 32, which makes it difficult to close the spaces S which serve as flow paths for the ink Q.

As described above, the absorber 1A in the liquid container according to this embodiment includes the first substrate 31 having multiple absorbent resins 3 supported therein and the second substrate 32 having multiple absorbent resins 3 supported therein. The first substrate 31 and the second substrate 32 are stacked on top of each other in the Z direction in the case 9 (not illustrated in FIG. 14). In plan view in the Z direction, the absorbent resins 3 supported in the first substrate 31 and the absorbent resins 3 supported in the second substrate 32 are positioned such that at least some of the absorbent resins 3 supported in the first substrate 31 do not overlap the absorbent resins 3 supported in the second substrate 32. The liquid container that stores the absorber 1A in which two absorbent resins 3 capable of absorbing the ink Q are disposed in the Z direction can absorb more ink Q than the liquid container 100 according to the first embodiment which stores the absorber 1 in which one absorbent resin 3 capable of absorbing the ink Q is disposed in the Z direction. Therefore, the liquid container according to this embodiment brings about great effects of absorbing more ink Q in addition to the effects according to the first embodiment of stably achieving the required amount of ink Q absorption and further stably avoiding a problem of leakage of the ink Q through the connection port 95.

It can also be said that the absorber 1A according to this embodiment has the same structure as the absorber 10 having a multilayer structure according to the second embodiment without the permeable members 21 and 22. In this embodiment and the second embodiment, two absorbent resins 3 are stacked on top of each other in the Z direction. However, the number of the absorbent resins 3 stacked in the Z direction is not limited to two, and the number of the absorbent resins 3 stacked in the Z direction may be more than two.

In the absorber 10 having a multilayer structure according to the second embodiment described above and the absorber 1A according to the third embodiment, the absorbent resins 3 to be supported on the substrates 2 need to be positioned at predetermined positions. For example, since water, PVA, glue, and the like function as adhesives for fixing the absorbent resins 3 to the substrate 2, water, PVA, glue, and the like are applied at predetermined positions of the substrate 2 by using a dispenser or the like, and the absorbent resins 3 are then sprayed on the substrate 2, whereby the absorbent resins 3 to be supported on the substrate 2 can be positioned at predetermined positions. For example, the absorbent resins 3 can be positioned by providing openings or recesses in the substrate 2 and fitting the absorbent resins 3 into the openings or recesses. Specifically, the absorbent resins 3 to be supported on the substrate 2 can be positioned at predetermined positions by forming openings or recesses at predetermined positions of the substrate 2 using a needle or the like and then spraying the absorbent resins 3.

4. Fourth Embodiment

Figure 15:
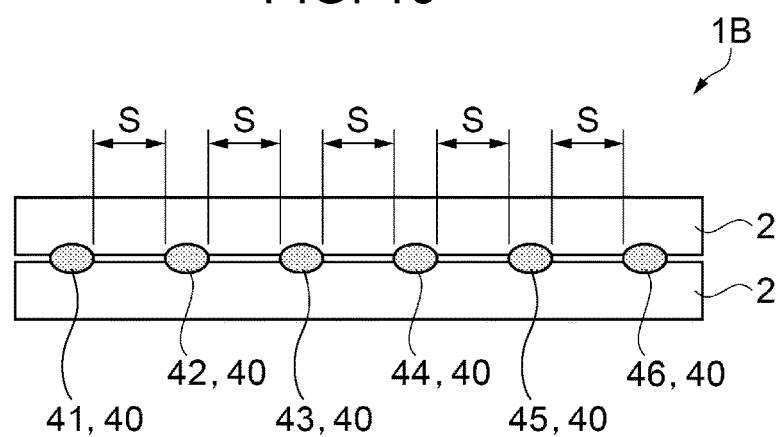
FIG. 15 is a schematic sectional view of an absorber according to a fourth embodiment.
Figure 16:
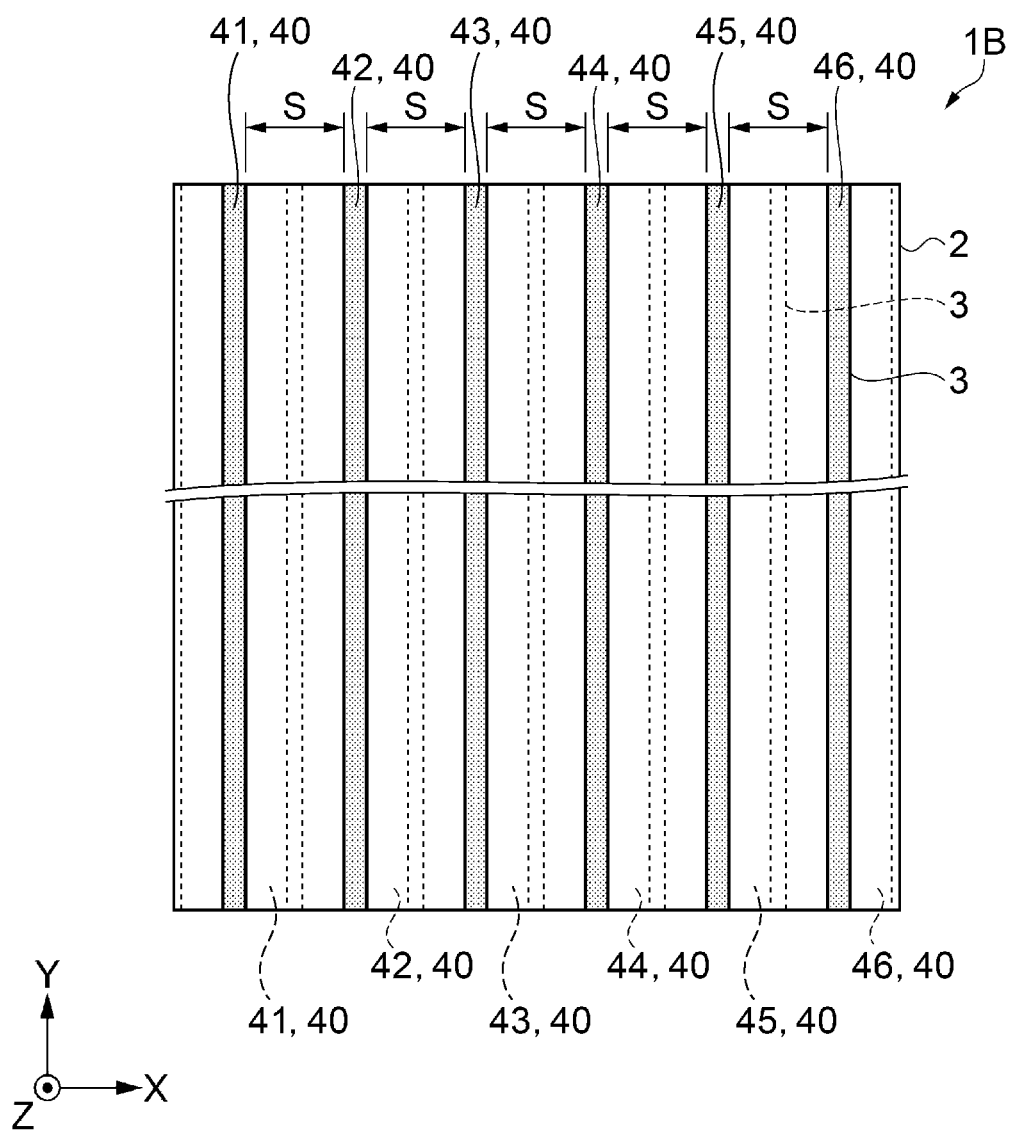
FIG. 16 is a schematic plan view of the absorber according to the fourth embodiment.
Figure 17:
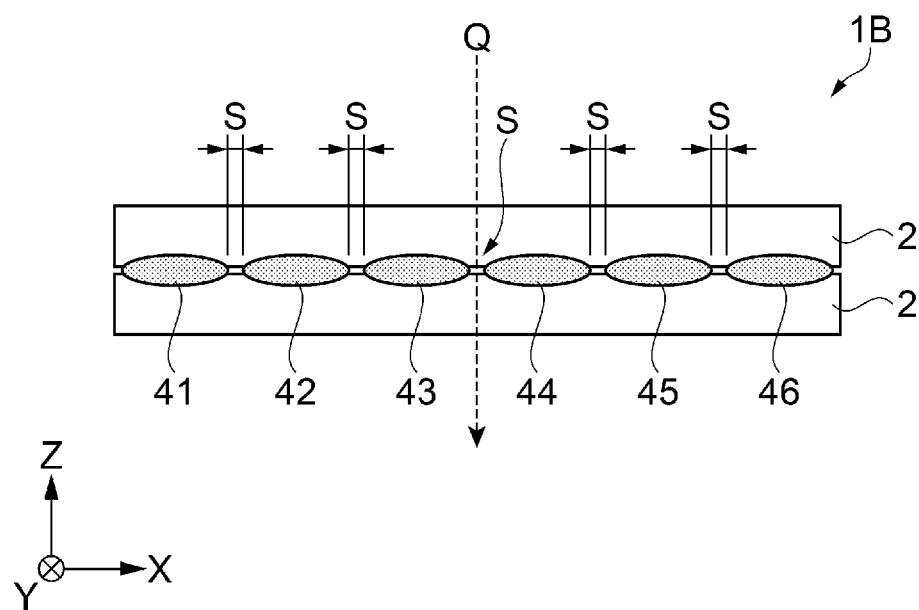
FIG. 17 is a schematic sectional view of the absorber after the absorber absorbs ink.
Figure 18:
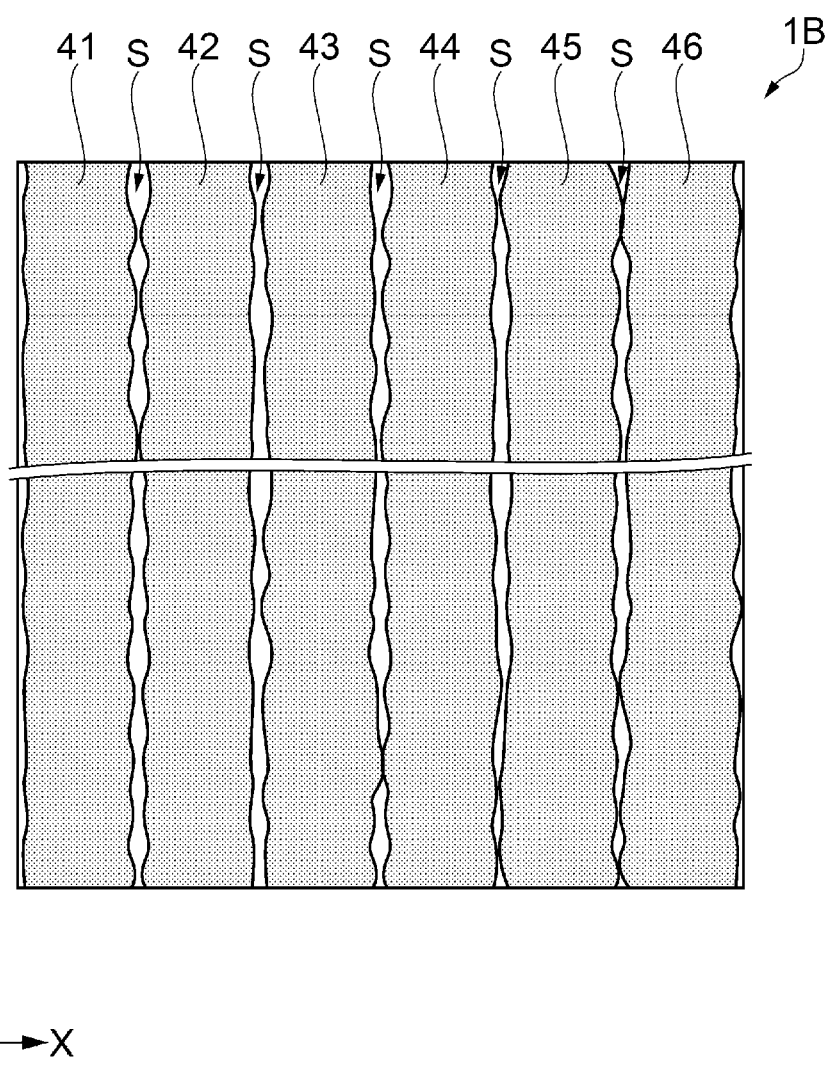
FIG. 18 is another schematic plan view of the absorber after the absorber absorbs ink.

FIG. 15 is a schematic sectional view of an absorber 1B according to a fourth embodiment. FIG. 16 is a schematic plan view of the absorber 1B according to this embodiment. FIG. 17 is a schematic sectional view of the absorber 1B according to this embodiment. FIG. 18 is another schematic plan view of the absorber 1B according to this embodiment. In FIG. 15, absorbent resin groups 41, 42, 43, 44, 45, and 46 before absorbing an ink Q are shaded and shown in solid lines. In FIG. 16, the absorbent resin groups 41, 42, 43, 44, 45, and 46 before absorbing the ink Q are shaded and shown in solid lines, and the absorbent resin groups 41, 42, 43, 44, 45, and 46 after absorbing the ink Q are shown in dashed lines. In FIG. 17 and FIG. 18, the absorbent resin groups 41, 42, 43, 44, 45, and 46 after absorbing the ink Q are shaded and shown in solid lines. Referring to FIG. 15 to FIG. 18, the overview of a liquid container according to this embodiment will be described below, mainly focusing on the differences from the first embodiment. The same components as those in the first embodiment are denoted by the same reference characters, and the overlapping description is omitted. In the following description, the absorbent resin groups 41, 42, 43, 44, 45, and 46 may be referred to as absorbent resin groups 40.

As illustrated in FIG. 15 and FIG. 16, the absorber 1B according to this embodiment includes substrates 2 and the absorbent resin groups 41, 42, 43, 44, 45, and 46 supported on the substrates 2. The absorber 1B has the same structure as the absorber 1 according to the first embodiment and has a structure in which the absorbent resin groups 41, 42, 43, 44, 45, and 46 are sandwiched between a pair of the substrates 2. The absorbent resin groups 41, 42, 43, 44, 45, and 46 are each composed of multiple absorbent resins 3 arranged in a line in the Y direction. The absorbent resin groups 41, 42, 43, 44, 45, and 46 each have a strip shape long in the Y direction. It can also be said that the absorbent resin groups 41, 42, 43, 44, 45, and 46 each include multiple absorbent resins 3, which swell by absorbing the ink Q, arranged in a line in the Y direction. The Y direction is an example first direction in this specification.

In the absorber 1B, the absorbent resin group 41, the absorbent resin group 42, the absorbent resin group 43, the absorbent resin group 44, the absorbent resin group 45, and the absorbent resin group 46 are arranged at regular intervals in the X direction. In other words, the absorbent resin groups 40 extending in lines in the Y direction are arranged at regular intervals in the X direction in the absorber 1B. Spaces S are formed between the absorbent resin group 41 and the absorbent resin group 42, between the absorbent resin group 42 and the absorbent resin group 43, between the absorbent resin group 43 and the absorbent resin group 44, between the absorbent resin group 44 and the absorbent resin group 45, and between the absorbent resin group 45 and the absorbent resin group 46. Such absorbent resin groups 40 can be formed by spraying the absorbent resins 3 on the substrate 2 to which water, PVA, and glue have been applied in advance in lines in the Y direction.

In the first embodiment described above, at least some of the absorbent resins 3 of the absorber 1 are spaced apart from the adjacent absorbent resins 3 when the absorbent resins 3 swell by absorbing the ink Q. In this embodiment, the absorbent resins 3 of the absorbent resin groups 40 come into contact with the adjacent absorbent resins 3 instead of being spaced apart from the adjacent absorbent resins 3 when the absorbent resins 3 swell by absorbing the ink Q. In other words, the absorbent resins 3 of the absorbent resin groups 40 in this embodiment are more densely arranged than the absorbent resins 3 of the absorber 1 according to the first embodiment. The absorbent resin groups 40 in which the absorbent resins 3 are densely arranged can absorb more ink Q compared with the case in which the absorbent resins 3 are sparsely arranged.

Of course, the absorbent resins 3 of the absorbent resin groups 40 according to this embodiment may be such that at least some of the absorbent resins 3 are spaced apart from the adjacent absorbent resins 3 when the absorbent resins 3 swell by absorbing the ink Q, like the absorbent resins 3 of the absorber 1 according to the first embodiment.

As illustrated in FIG. 16 and FIG. 17, the absorbent resin groups 40 are spaced apart from the adjacent absorbent resin groups 40 with the absorbent resin groups 40 swelling by absorbing the ink Q. When the absorbent resin groups 40 swell by absorbing the ink Q, spaces S are thus provided between the absorbent resin groups 40 and the adjacent absorbent resin groups 40, and the spaces S are not closed. The spaces S between the absorbent resin groups 40 and the adjacent absorbent resin groups 40 functions as flow paths for the ink Q. As indicated by the dashed arrow in the figure, the ink Q passes through a space S of the absorber 1B and flows from one surface of the absorber 1B to the other surface of the absorber 1B. In other words, the absorber 1B thus does not inhibit the flow of the ink Q even when the absorbent resin groups 40 swell by absorbing the ink Q.

With regard to, for example, the absorbent resin group 42, the absorbent resin groups 41 and 43 are adjacent to the absorbent resin group 42. In this case, the absorbent resin group 42 includes multiple absorbent resins 3, which swell by absorbing the ink Q, arranged in a line in the Y direction and corresponds to an example "first resin group" in this specification. The absorbent resin groups 41 and 43 include multiple absorbent resins 3, which swell by absorbing the ink Q, arranged in lines in the Y direction with the spaces S between the absorbent resin groups 41 and 43 and the absorbent resin group 42 and correspond to example "second resin groups" in this specification. In the liquid container (absorber 1B) according to this embodiment, the absorbent resins 3 of the absorbent resin group 42 are spaced apart from the absorbent resins 3 of the absorbent resin groups 41 and 43 with the absorbent resins 3 swelling by absorbing the ink Q.

With regard to, for example, the absorbent resin group 43, the absorbent resin groups 42 and 44 are adjacent to the absorbent resin group 43. In this case, the absorbent resin group 43 includes multiple absorbent resins 3, which swell by absorbing the ink Q, arranged in a line in the Y direction and corresponds to an example "first resin group" in this specification. The absorbent resin groups 42 and 44 include multiple absorbent resins 3, which swell by absorbing the ink Q, arranged in lines in the Y direction with the spaces S between the absorbent resin groups 42 and 44 and the absorbent resin group 42 and correspond to example "second resin groups" in this specification. In the liquid container (absorber 1B) according to this embodiment, the absorbent resins 3 of the absorbent resin group 43 are spaced apart from the absorbent resins 3 of the absorbent resin groups 42 and 44 with the absorbent resins 3 swelling by absorbing the ink Q.

As illustrated in FIG. 18, some of the absorbent resins 3 of the absorbent resin group 42 may be spaced apart from the absorbent resins 3 of the absorbent resin groups 41 and 43 with the absorbent resins 3 swelling by absorbing the ink Q. Similarly, some of the absorbent resins 3 of the absorbent resin group 43 may be spaced apart from the absorbent resins 3 of the absorbent resin groups 42 and 44 with the absorbent resins 3 swelling by absorbing the ink Q. In other words, at least some of the absorbent resins 3 of the absorbent resin group 40 that is an example first resin group are spaced apart from the absorbent resins 3 of the absorbent resin group 40 that is an example second resin group with the absorbent resins 3 swelling by absorbing the ink Q.

As described above, the liquid container according to this embodiment includes: the case 9 having the connection port 95 through which the ink Q is introduced and the storage space 96 which stores the ink Q; and the absorber 1B stored in the case 9 and configured to absorb the ink Q. The absorber 1B includes: the first resin group (e.g., absorbent resin group 42) in which multiple absorbent resins 3, which swell by absorbing the ink Q, are arranged in a line in the Y direction; the second resin groups (e.g., absorbent resin groups 41 and 43) in which multiple absorbent resins 3, which swell by absorbing the ink Q, are arranged in lines in the Y direction with the spaces S between the second resin groups and the first resin group (e.g., absorbent resin group 42); and the substrates 2 which support the first resin group (e.g., absorbent resin group 42) and the second resin groups (e.g., absorbent resin groups 41 and 43) and allow the ink Q to permeate therethrough. With the absorbent resins 3 swelling by absorbing the ink Q, at least some of the absorbent resins 3 of the first resin group (e.g., absorbent resin group 42) are spaced apart from the absorbent resins 3 of the second resin groups (e.g., absorbent resin groups 41 and 43). The liquid container according to this embodiment which stores the absorber 1B having such a structure brings about effects of stably achieving the required amount of ink Q absorption and further stably avoiding a problem of leakage of the ink Q through the connection port 95, which are the same effects as in the first embodiment.

5. Fifth Embodiment

Figure 19:
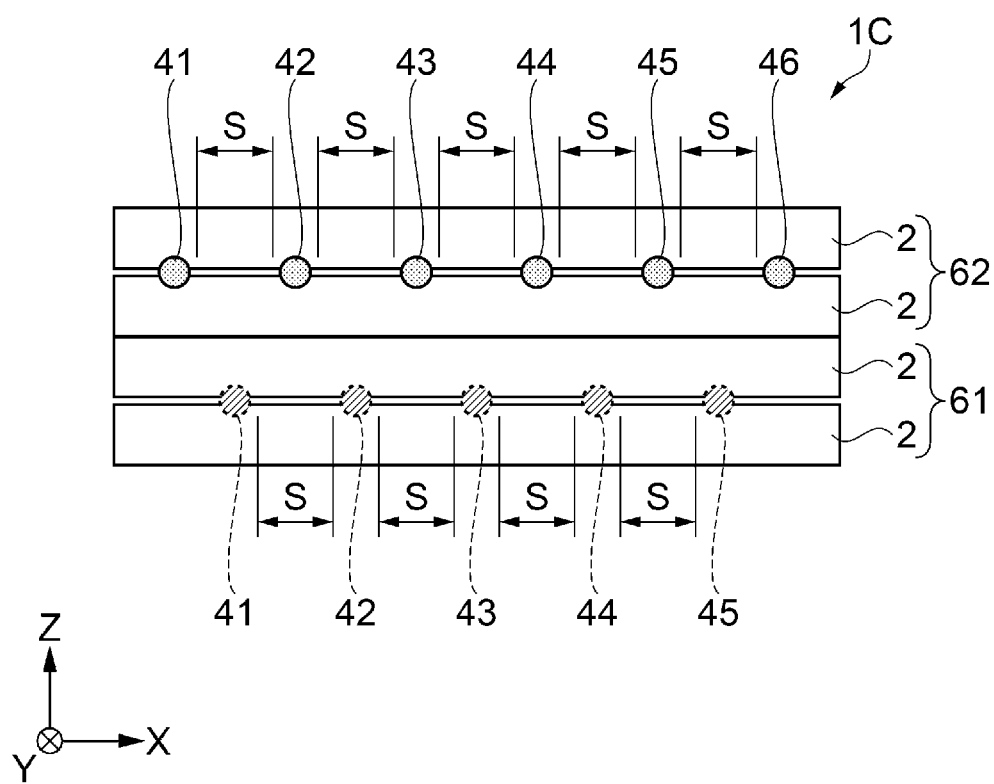
FIG. 19 is a schematic sectional view of an absorber according to a fifth embodiment.
Figure 20:
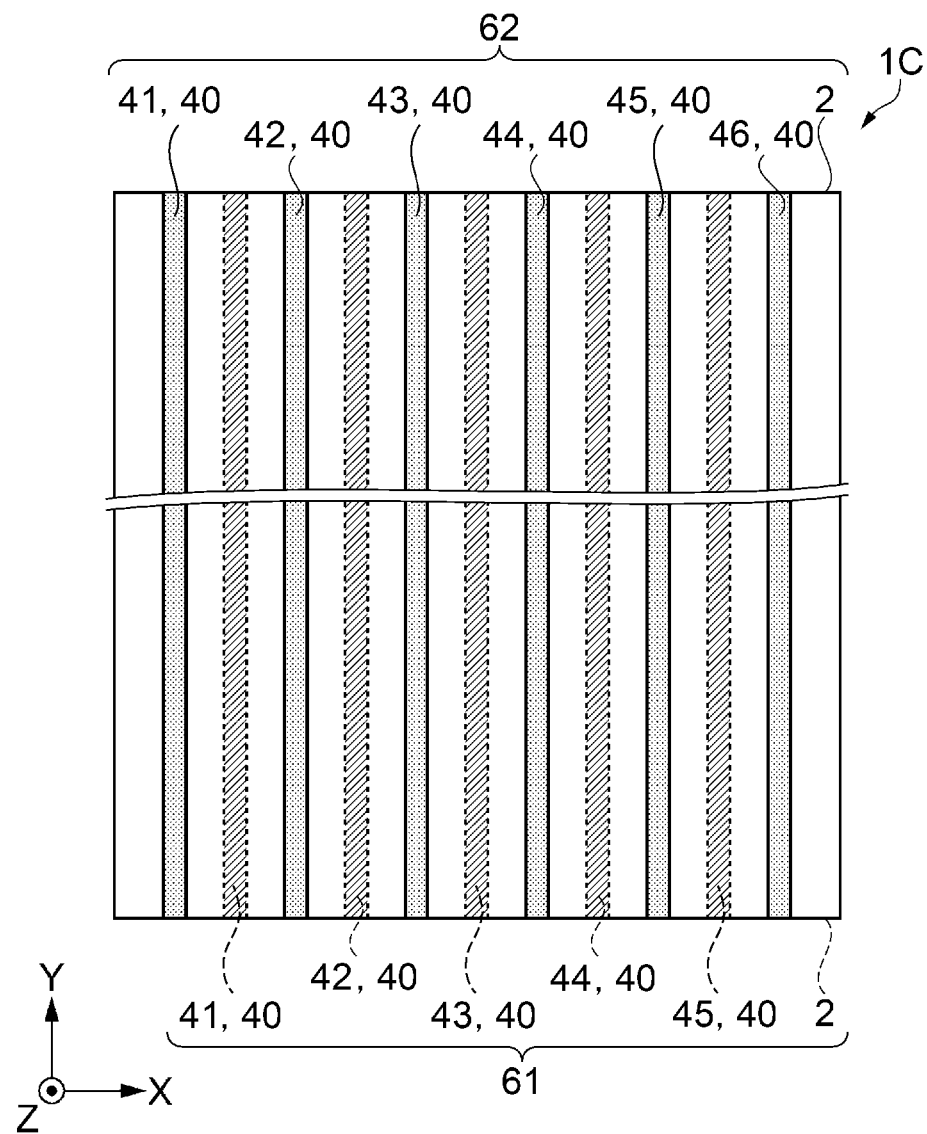
FIG. 20 is a schematic plan view of the absorber according to the fifth embodiment.

FIG. 19 is a schematic sectional view of an absorber 1C according to a fifth embodiment. FIG. 20 is a schematic plan view of the absorber 1C according to this embodiment. In FIG. 19 and FIG. 20, absorbent resin groups 41, 42, 43, 44, and 45 of a first substrate 61 are hatched and shown in dashed lines, and absorbent resin groups 41, 42, 43, 44, 45, and 46 of a second substrate 62 are shaded and shown in solid lines. FIG. 19 and FIG. 20 illustrate the absorbent resin groups 41, 42, 43, 44, 45, and 46 before absorption of an ink Q. Referring to FIG. 19 and FIG. 20, the overview of a liquid container according to this embodiment will be described below, mainly focusing on the differences from the fourth embodiment. The same components as those in the fourth embodiment are denoted by the same reference characters, and the overlapping description is omitted.

As illustrated in FIG. 19 and FIG. 20, the absorber 1C according to this embodiment includes the first substrate 61 and the second substrate 62. The first substrate 61 and the second substrate 62 are stacked on top of each other in the Z direction in a case 9 (not illustrated in FIG. 19 and FIG. 20). The first substrate 61 supports a first resin group (e.g., absorbent resin group 42) and second resin groups (e.g., absorbent resin groups 41 and 43). Similarly, the second substrate 62 supports a first resin group (e.g., absorbent resin group 42) and second resin groups (e.g., absorbent resin groups 41 and 43).

In plan view in the Z direction, absorbent resin groups 40 supported in the first substrate 61 and absorbent resin groups 40 supported in the second substrate 62 are positioned such that the absorbent resin groups 40 supported in the first substrate 61 do not overlap the absorbent resin groups 40 supported in the second substrate 62. In other words, in plan view in the Z direction, the absorbent resin groups 40 are disposed in each of the first substrate 61 and the second substrate 62 such that the absorbent resin groups 40 of the first substrate 61 overlap spaces S of the second substrate 62 and the absorbent resin groups 40 of the second substrate 62 overlap spaces S of the first substrate 61.

In this embodiment, in plan view in the Z direction, the absorbent resin groups 40 supported in the first substrate 61 and the absorbent resin groups 40 supported in the second substrate 62 are positioned such that the absorbent resin groups 40 supported in the first substrate 61 do not overlap the absorbent resin groups 40 supported in the second substrate 62. However, the absorbent resin groups 40 supported in the first substrate 61 and the absorbent resin groups 40 supported in the second substrate 62 may be positioned such that portions of the absorbent resin groups 40 supported in the first substrate 61 do not overlap the absorbent resin groups 40 supported in the second substrate 62. In other words, in plan view in the Z direction, the first resin group (e.g., absorbent resin group 42) and the second resin groups (e.g., absorbent resin groups 41 and 43) supported in the first substrate 61 and the first resin group (e.g., absorbent resin group 42) and the second resin groups (e.g., absorbent resin groups 41 and 43) supported in the second substrate 62 may be positioned such that at least portions of the first and second resin groups supported in the first substrate 61 do not overlap the first and second resin groups supported in the second substrate 62. The expression "at least a portion of an absorbent resin group does not overlap" in this specification means that, in plan view in the Z direction, 60% or more of an absorbent resin group 40 supported in the first substrate 61 does not overlap an absorbent resin group 40 supported in the second substrate 62 and 60% or more of an absorbent resin group 40 supported in the second substrate 62 does not overlap an absorbent resin group 40 supported in the first substrate 61.

In a case in which the absorbent resin groups 40 of the first substrate 61 overlap the spaces S of the second substrate 62 in plan view in the Z direction, the spaces S of the second substrate 62 ensure spaces for receiving the expanded absorbent resin groups 40 of the first substrate 61 when the absorbent resin groups 40 of the first substrate 61 swell by absorbing the ink Q. As a result, the absorbent resin groups 40 of the first substrate 61 are unlikely to come into contact with the adjacent absorbent resin groups 40, which makes it difficult to close the spaces S formed in the first substrate 61. In a case in which the absorbent resin groups 40 of the second substrate 62 overlap the spaces S of the first substrate 61 in plan view in the Z direction, the spaces S of the first substrate 61 ensure spaces for receiving the expanded absorbent resin groups 40 of the second substrate 62 when the absorbent resin groups 40 of the second substrate 62 swell by absorbing the ink Q. As a result, the absorbent resin groups 40 of the second substrate 62 are unlikely to come into contact with the adjacent absorbent resin groups 40, which makes it difficult to close the spaces S formed in the second substrate 62.

Since the absorber 1C according to this embodiment includes two absorbent resin groups 40 in the Z direction and the absorber 1B according to the fourth embodiment includes one absorbent resin group 40 in the Z direction, the liquid container storing the absorber 1C according to this embodiment can absorb more ink Q than the liquid container storing the absorber 1B according to the fourth embodiment.

As described above, the absorber 1C in the liquid container according to this embodiment includes the first substrate 61 which supports the first resin group (e.g., absorbent resin group 42) and the second resin groups (e.g., absorbent resin groups 41 and 43) and the second substrate 62 which supports the first resin group (e.g., absorbent resin group 42) and the second resin groups (e.g., absorbent resin groups 41 and 43). In addition, the first substrate 61 and the second substrate 62 are stacked on top of each other in the Z direction in the case 9. In plan view in the Z direction, the first resin group (e.g., absorbent resin group 42) and the second resin groups (e.g., absorbent resin groups 41 and 43) supported in the first substrate 61 and the first resin group (e.g., absorbent resin group 42) and the second resin groups (e.g., absorbent resin groups 41 and 43) supported in the second substrate 62 are positioned such that at least portions of the first and second resin groups supported in the first substrate 61 do not overlap the first and second resin groups supported in the second substrate 62. The liquid container according to this embodiment which stores the absorber 1C having such a structure brings about great effects of absorbing more ink Q in addition to the effects according to the fourth embodiment of stably achieving the required amount of ink Q absorption and further stably avoiding a problem of leakage of the ink Q through the connection port 95.

6. Sixth Embodiment

Figure 21:
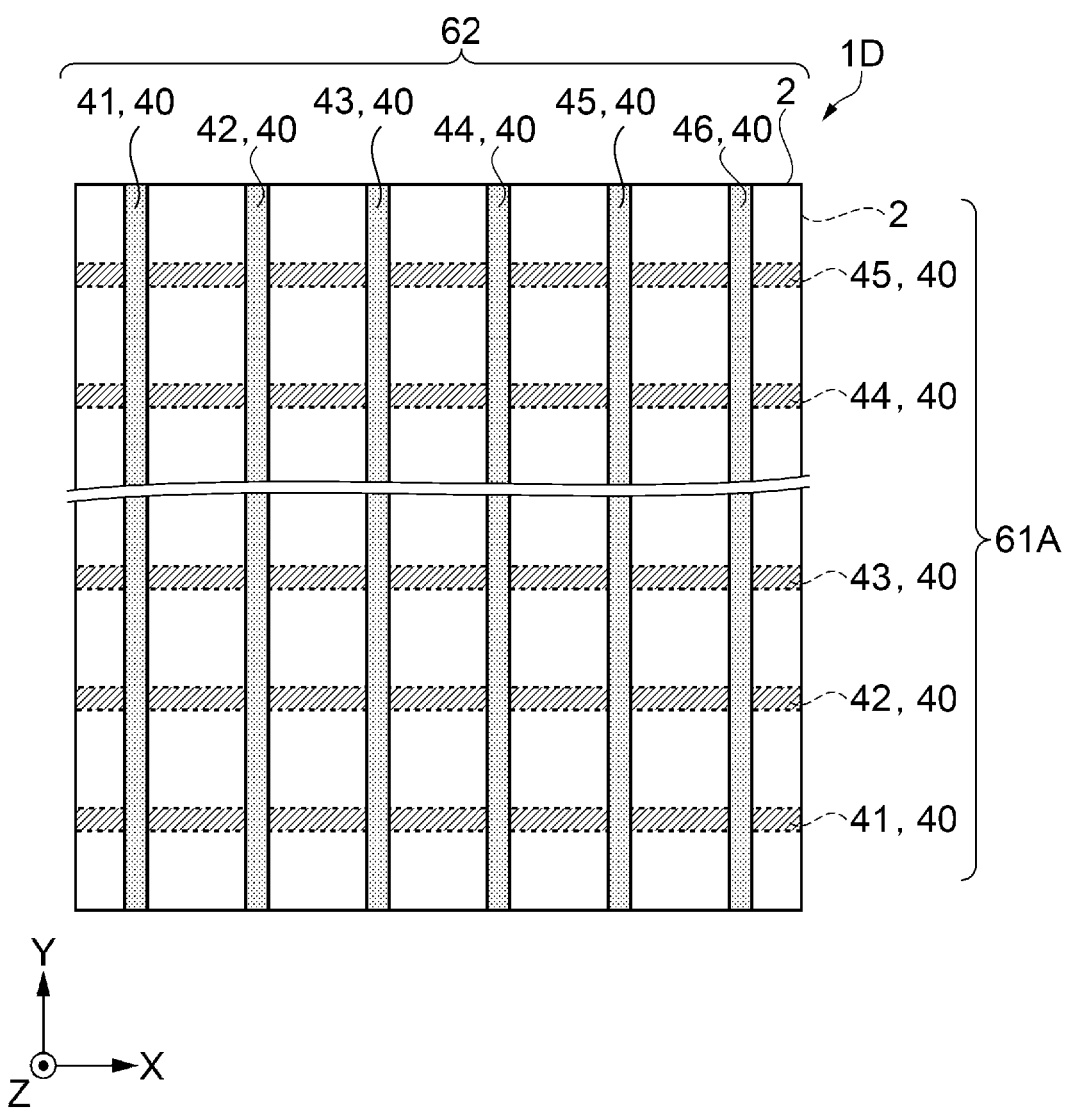
FIG. 21 is a schematic plan view of an absorber according to a sixth embodiment.

FIG. 21 is a view corresponding to FIG. 20 and a schematic plan view of an absorber 1D according to a sixth embodiment. Referring to FIG. 21, the overview of a liquid container according to this embodiment will be described below, mainly focusing on the differences from the fifth embodiment. The same components as those in the fifth embodiment are denoted by the same reference characters, and the overlapping description is omitted.

As illustrated in FIG. 21, the absorber 1D according to this embodiment includes a first substrate 61A and a second substrate 62 stacked in order in the Z direction. In the second substrate 62 according to this embodiment, absorbent resin groups 40 extending in lines in the Y direction are arranged at regular intervals in the X direction. In the first substrate 61A according to this embodiment, absorbent resin groups 40 extending in lines in the X direction are arranged at regular intervals in the Y direction. In the second substrate 62 according to the fifth embodiment, absorbent resin groups 40 extending in lines in the Y direction are arranged at regular intervals in the X direction. In the first substrate 61 according to the fifth embodiment, absorbent resin groups 40 extending in lines in the Y direction are arranged at regular intervals in the X direction.

In the absorber 1D according to this embodiment, the absorbent resin groups 40 of the first substrate 61A intersect the absorbent resin groups 40 of the second substrate 62 in plan view in the Z direction. In the absorber 1C according to the fifth embodiment, the absorbent resin groups 40 of the first substrate 61 and the absorbent resin groups 40 of the second substrate 62 are positioned such that at least portions of the absorbent resin groups 40 of the first substrate 61 do not overlap the absorbent resin groups 40 of the second substrate 62. This embodiment differs from the fifth embodiment in the configuration of the absorbent resin groups 40 in the first substrate 61 and 61A.

As described above, the absorber 1D in the liquid container according to this embodiment includes the first substrate 61A which supports the first resin group (e.g., absorbent resin group 42) and the second resin group (e.g., absorbent resin group 43) and the second substrate 62 which supports the first resin group (e.g., absorbent resin group 42) and the second resin group (e.g., absorbent resin group 43). The first substrate 61A and the second substrate 62 are stacked on top of each other in the Z direction in the case 9. In plan view in the Z direction, the first resin group and the second resin group supported in the first substrate 61A intersect the first resin group and the second resin group supported in the second substrate 62. The liquid container according to this embodiment which stores the absorber 1D having such a structure brings about the same effects as the liquid container according to the fifth embodiment.

7. Seventh Embodiment

Figure 22:
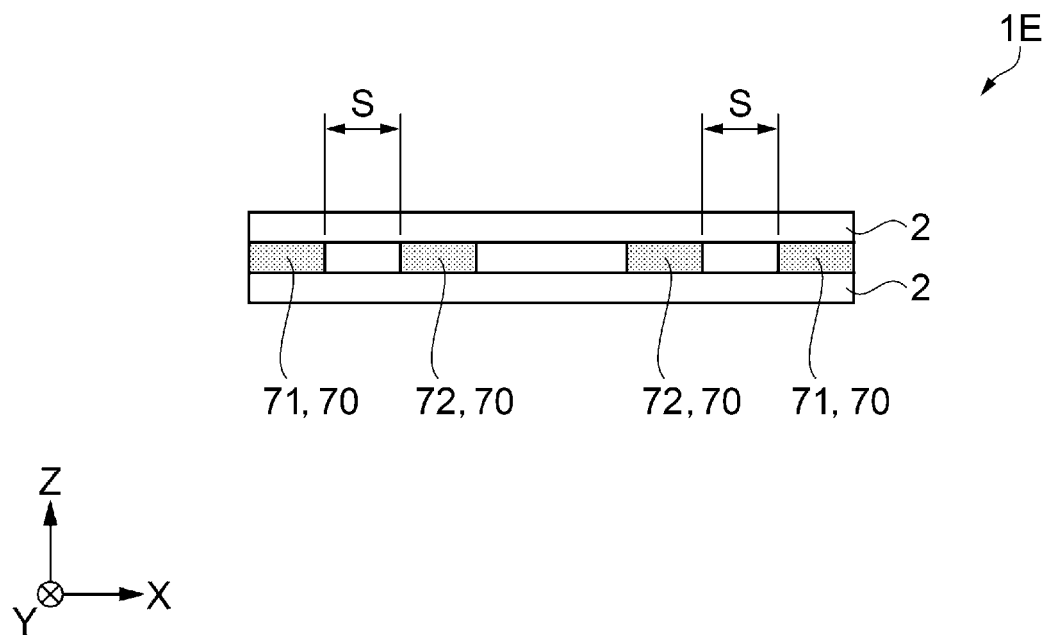
FIG. 22 is a schematic sectional view of an absorber according to a seventh embodiment.
Figure 23:
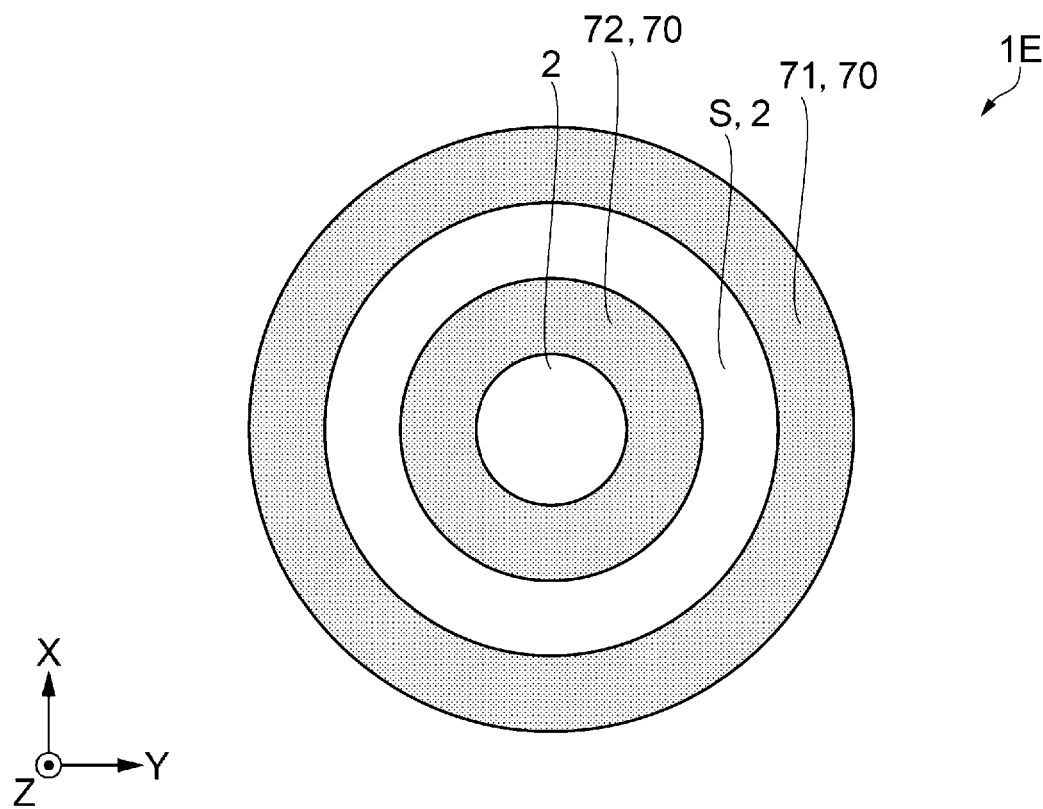
FIG. 23 is a schematic plan view of the absorber according to the seventh embodiment.

FIG. 22 is a schematic sectional view of an absorber 1E according to a seventh embodiment. FIG. 23 is a schematic plan view of the absorber 1E according to this embodiment. In FIG. 22 and FIG. 23, ring-shaped resin groups 70 are shaded and shown in solid lines. FIG. 22 and FIG. 23 illustrate the ring-shaped resin groups 70 before absorption of an ink Q. Referring to FIG. 22 and FIG. 23, the overview of a liquid container according to this embodiment will be described below, mainly focusing on the differences from the fourth embodiment. The same components as those in the fourth embodiment are denoted by the same reference characters, and the overlapping description is omitted.

In this embodiment, substrates 2 have a circular shape. In the fourth embodiment, the substrates 2 have a rectangular shape long in the Y direction. In this embodiment, as illustrated in FIG. 22 and FIG. 23, multiple absorbent resins 3 which swell by absorbing the ink Q are arranged in a ring shape to form the ring-shaped resin groups 70. The outer edge of the ring-shaped resin groups 70 has a circular shape. In the fourth embodiment, multiple absorbent resins 3 which swell by absorbing the ink Q are arranged in lines in the Y direction to form the absorbent resin groups 40. The outer edge of the absorbent resin groups 40 has a rectangular shape long in the Y direction. This point is a different point between this embodiment and the fourth embodiment. The absorber 1E according to this embodiment has a structure in which the ring-shaped resin groups 70 are sandwiched between a pair of the substrates 2. This point is the same in this embodiment and the fourth embodiment.

The ring-shaped resin groups 70 include a ring-shaped resin group 71 and a ring-shaped resin group 72 inside the ring-shaped resin group 71. A space S is provided between the ring-shaped resin group 71 and the ring-shaped resin group 72. The ring-shaped resin group 71 is an example first ring-shaped resin group in this specification. The ring-shaped resin group 72 is an example second ring-shaped resin group in this specification.

With the absorbent resins 3 of the ring-shaped resin groups 70 swelling by absorbing the ink Q, at least some of the absorbent resins 3 of the ring-shaped resin group 71, which is an example first ring-shaped resin group, are spaced apart from the absorbent resins 3 of the ring-shaped resin group 72, which is an example second ring-shaped resin group. Thus, the absorbent resins 3 even when swelling by absorbing the ink Q do not close the space S or inhibit the flow of the ink Q. In the fourth embodiment, at least some of the absorbent resins 3 are spaced apart from the adjacent absorbent resins 3 with the absorbent resins 3 of the absorbent resin groups 40 swelling by absorbing the ink Q, and the absorbent resins 3 even when swelling by absorbing the ink Q do not close the space S or inhibit the flow of the ink Q. This point is the same in this embodiment and the fourth embodiment.

As described above, the liquid container according to this embodiment includes: the case 9 having the connection port 95 through which the ink Q is introduced and the storage space 96 which stores the ink Q; and the absorber 1E stored in the case 9 and configured to absorb the ink Q. The absorber 1E includes: the first ring-shaped resin group (ring-shaped resin group 71) in which multiple absorbent resins 3 which swell by absorbing the ink Q are arranged in a ring shape; the second ring-shaped resin group (ring-shaped resin group 72) in which multiple absorbent resins 3 which swell by absorbing the ink Q are arranged in a ring shape with the space S between the second ring-shaped resin group and the first ring-shaped resin group; and the substrates 2 which support the ring-shaped resin group 71 and the ring-shaped resin group 72 and allow the ink Q to permeate therethrough. With the absorbent resins 3 swelling by absorbing the ink Q, at least some of the absorbent resins 3 of the ring-shaped resin group 71 are spaced apart from the absorbent resins 3 of the ring-shaped resin group 72. The liquid container according to this embodiment which stores the absorber 1E having such a structure brings about effects of stably achieving the required amount of ink Q absorption and further stably avoiding a problem of leakage of the ink Q through the connection port 95, which are the same effects as in the fourth embodiment.

8. Eighth Embodiment

Figure 24:
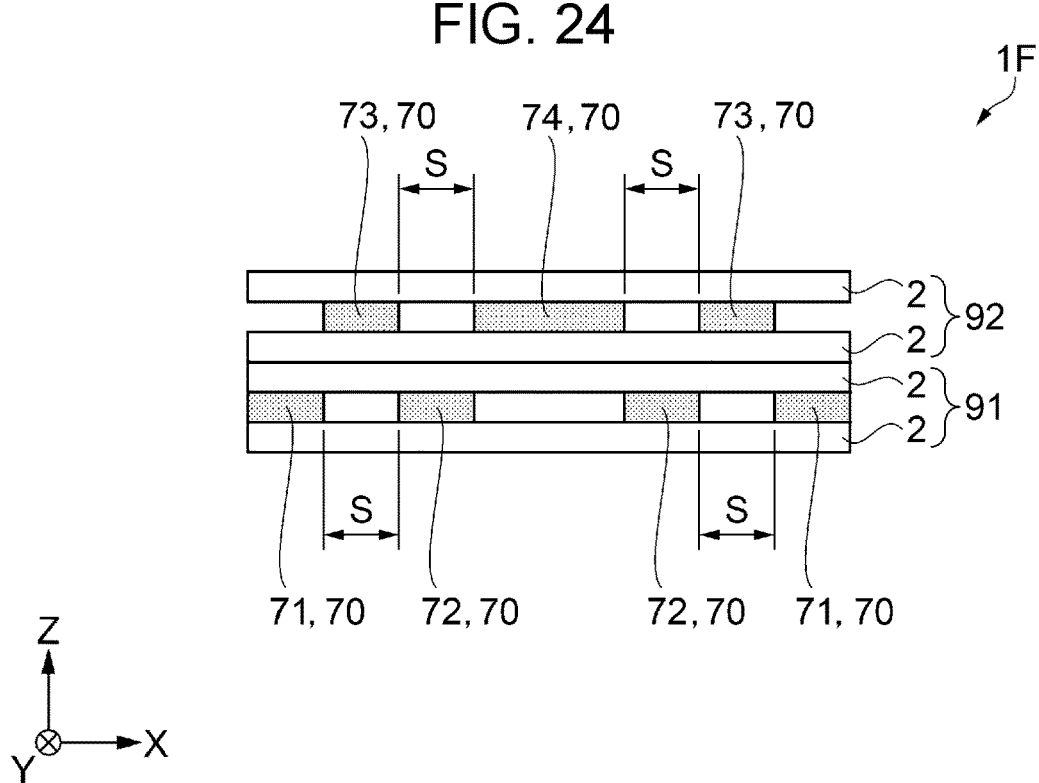
FIG. 24 is a schematic sectional view of an absorber according to an eighth embodiment.
Figure 25:
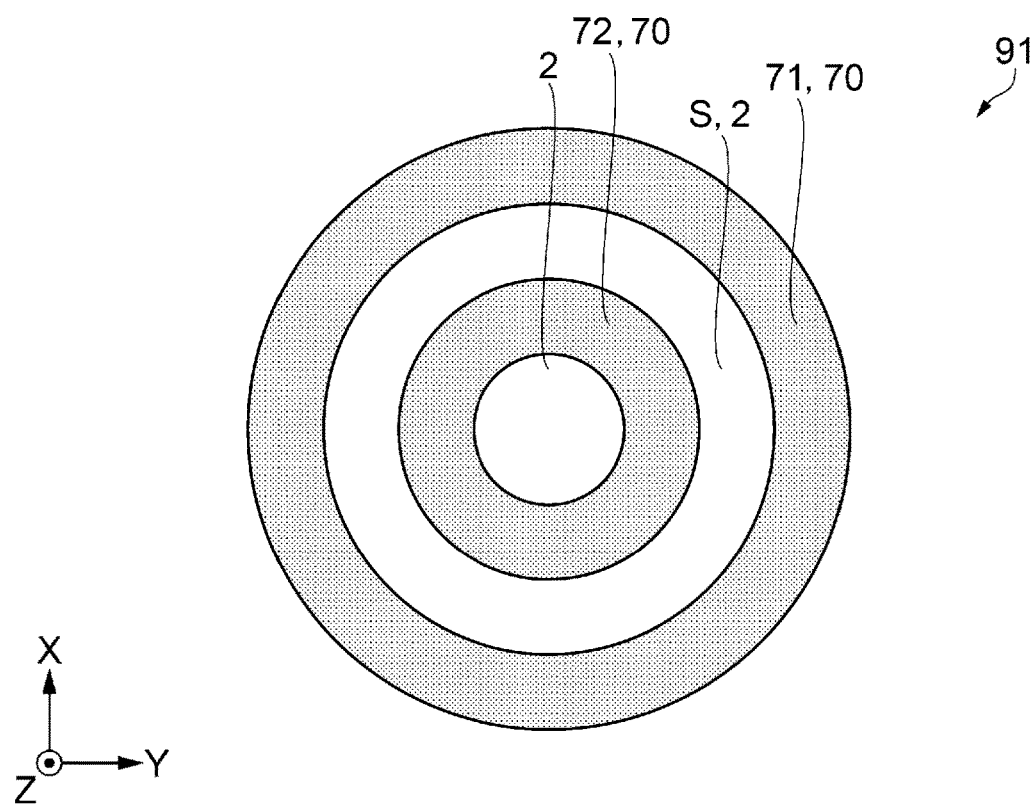
FIG. 25 is a schematic plan view of a first substrate.
Figure 26:
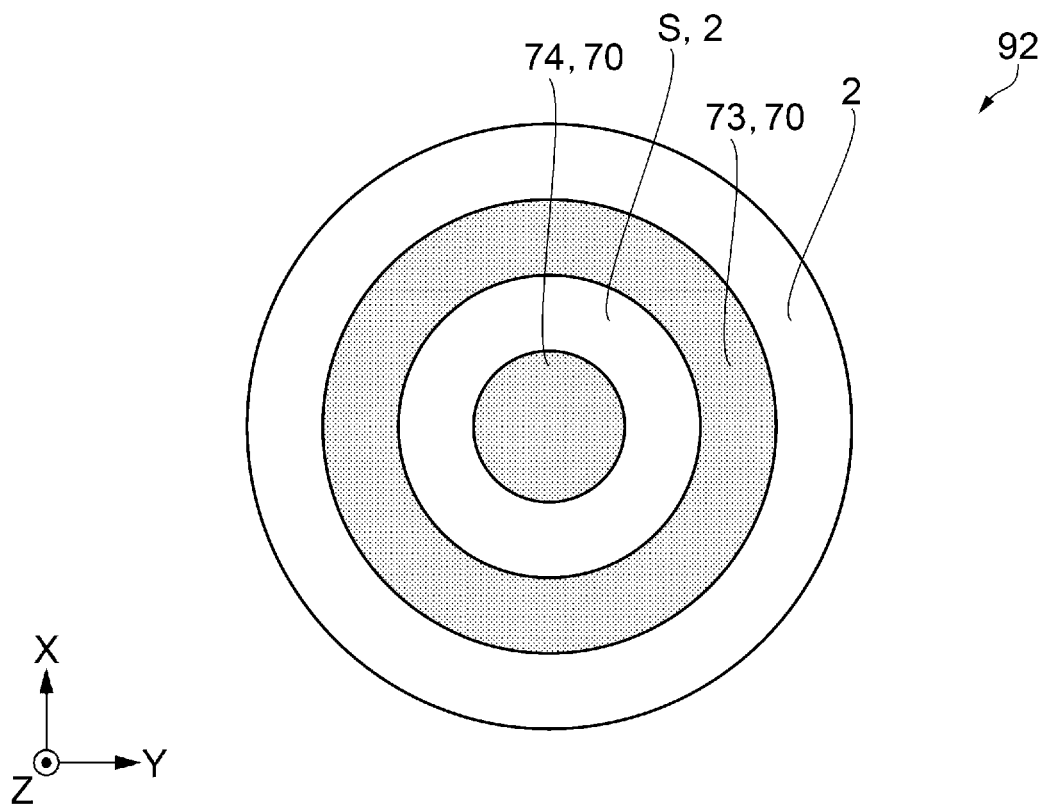
FIG. 26 is a schematic plan view of a second substrate.

FIG. 24 is a schematic sectional view of an absorber 1F according to an eighth embodiment. FIG. 25 is a schematic plan view of a first substrate 91. FIG. 26 is a schematic plan view of a second substrate 92. In FIG. 24 to FIG. 26, ring-shaped resin groups 70 are shaded and shown in solid lines. FIG. 24 to FIG. 26 illustrate the ring-shaped resin groups 70 before absorption of an ink Q. Referring to FIG. 24 to FIG. 26, the overview of a liquid container according to this embodiment will be described below, mainly focusing on the differences from the seventh embodiment.

As illustrated in FIG. 24, the absorber 1F according to this embodiment includes the first substrate 91 and the second substrate 92 stacked in order in the Z direction. The first substrate 91 has a structure in which ring-shaped resin groups 70 are sandwiched between a pair of substrates 2 and supports a ring-shaped resin group 71 and a ring-shaped resin group 72 disposed inside the ring-shaped resin group 71. The second substrate 92 has a structure in which ring-shaped resin groups 70 are sandwiched between a pair of substrates 2 and supports a ring-shaped resin group 73 and a ring-shaped resin group 74 disposed inside the ring-shaped resin group 73. The ring-shaped resin group 71 of the first substrate 91 and the ring-shaped resin group 73 of the second substrate 92 are example first ring-shaped resin groups in this specification. The ring-shaped resin group 72 of the first substrate 91 and the ring-shaped resin group 74 of the second substrate 92 are example second ring-shaped resin groups in this specification.

When the absorbent resins 3 do not absorb the ink Q or swell, in plan view in the Z direction, the ring-shaped resin group 71 and the ring-shaped resin group 72 supported in the first substrate 91 and the ring-shaped resin group 73 and the ring-shaped resin group 74 supported in the second substrate 92 may be positioned such that at least portions of the ring-shaped resin groups 71 and 72 supported in the first substrate 91 do not overlap the ring-shaped resin groups 73 and 74 supported in the second substrate 92. With the absorbent resins 3 swelling by absorbing the ink Q, at least some of the absorbent resins 3 of the ring-shaped resin groups 71 and 73 which are example first ring-shaped resin groups are spaced apart from the absorbent resins 3 of the ring-shaped resin groups 72 and 74 which are example second ring-shaped resin groups. Thus, the absorbent resins 3 even when swelling by absorbing the ink Q do not close the space S or inhibit the flow of the ink Q.

Since the absorber 1F according to this embodiment includes two ring-shaped resin group 70 in the Z direction and the absorber 1E according to the seventh embodiment includes one ring-shaped resin group 70 in the Z direction, the liquid container storing the absorber 1F according to this embodiment can absorb more ink Q than the liquid container storing the absorber 1E according to the seventh embodiment.

As described above, the absorber 1F according to this embodiment includes the first substrate 91 which supports the first ring-shaped resin group (e.g., ring-shaped resin group 71) and the second ring-shaped resin group (e.g., ring-shaped resin group 72) and the second substrate 92 which supports the first ring-shaped resin group (e.g., ring-shaped resin group 73) and the second ring-shaped resin group (e.g., ring-shaped resin group 74). The first substrate 91 and the second substrate 92 are stacked on top of each other in the Z direction in the case 9. In plan view in the Z direction, the first ring-shaped resin group (ring-shaped resin group 71) and the second ring-shaped resin group (ring-shaped resin group 72) supported in the first substrate 91 and the first ring-shaped resin group (ring-shaped resin group 73) and the second ring-shaped resin group (ring-shaped resin group 74) supported in the second substrate 92 are positioned such that at least portions of the first and second ring-shaped resin groups supported in the first substrate 91 do not overlap the first and second ring-shaped resin groups supported in the second substrate 92. The liquid container according to this embodiment which stores the absorber 1F having such a structure brings about great effects of absorbing more ink Q in addition to the effects according to the seventh embodiment of stably achieving the required amount of ink Q absorption and further stably avoiding a problem of leakage of the ink Q through the connection port 95.

9. Ninth Embodiment

Figure 27:
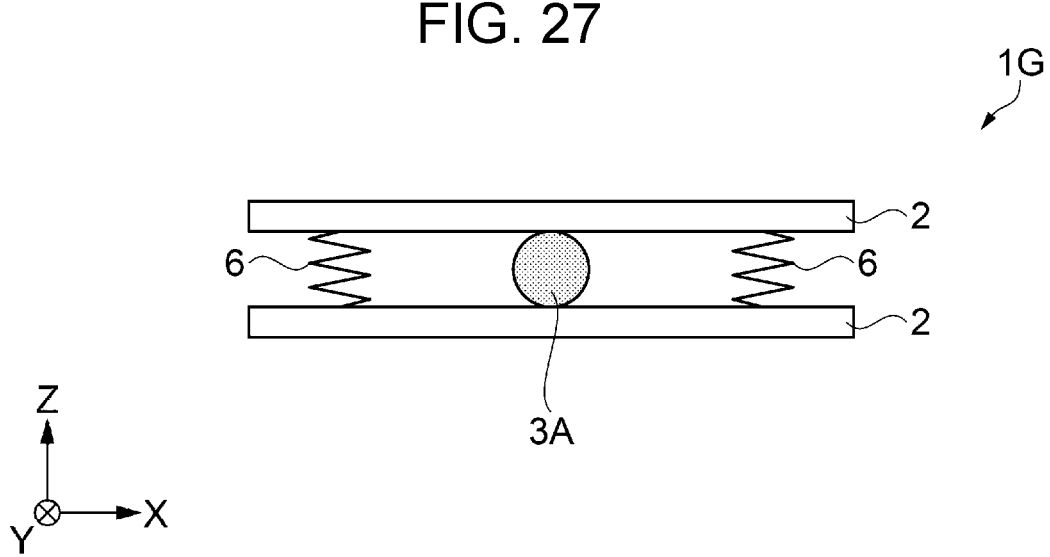
FIG. 27 is a schematic sectional view of an absorber according to a ninth embodiment.
Figure 28:
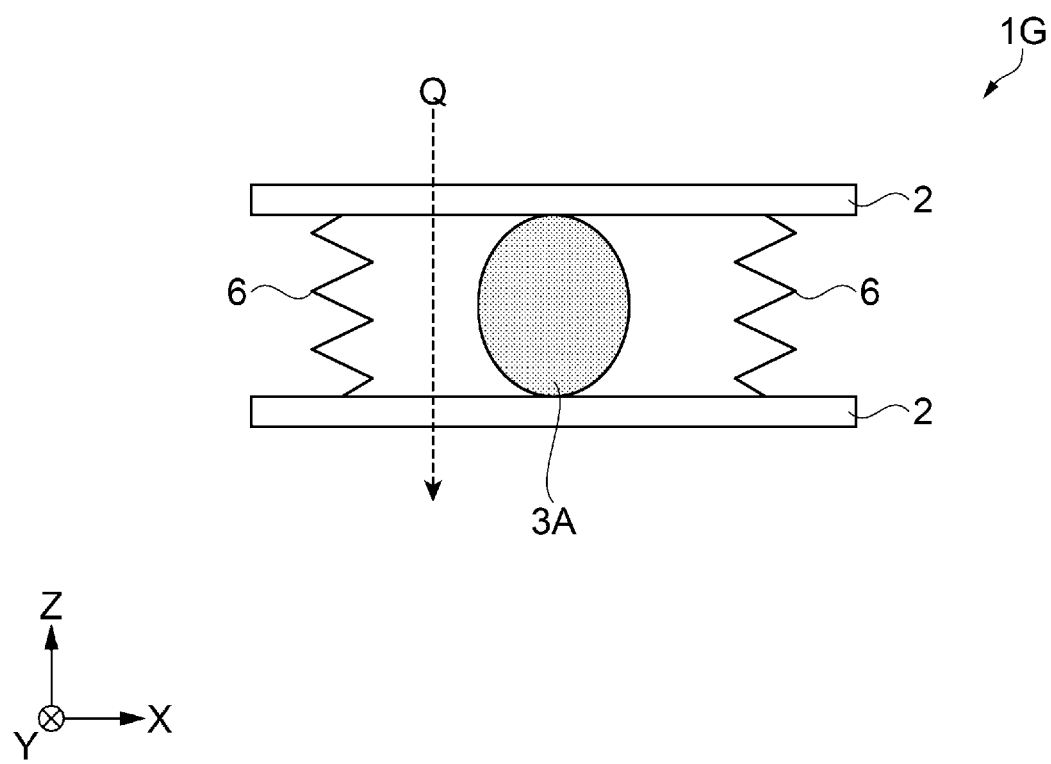
FIG. 28 is a schematic sectional view of the absorber after the absorber absorbs ink.

FIG. 27 and FIG. 28 are schematic sectional views of an absorber 1G according to a ninth embodiment. FIG. 27 illustrates an absorbent resin 3A which does not absorb an ink Q or swell, and FIG. 28 illustrates the absorbent resin 3A which swells by absorbing an ink Q. Referring to FIG. 27 and FIG. 28, the overview of a liquid container according to this embodiment will be described below, mainly focusing on the differences from the first embodiment.

As illustrated in FIG. 27 and FIG. 28, the absorber 1G according to this embodiment has a structure in which the absorbent resin 3A sandwiched between a pair of substrates 2. The absorber 1G according to this embodiment further includes stretchable members 6 on both sides of the absorbent resin 3A. In other words, the absorber 1G according to this embodiment has a structure in which the stretchable member 6, the absorbent resin 3A, and the stretchable member 6 are sandwiched between a pair of the substrates 2. The number of the absorbent resin 3A may be one or may be two or more. The number of the stretchable members 6 may be two or may be more than two.

The average particle size of the absorbent resin 3A according to this embodiment is larger than the average particle size of the absorbent resin 3 according to the first embodiment. In this embodiment, the absorbent resin 3 having an average particle size of about 1000 μm to about 5000 μm is used. Of course, the average particle size of the absorbent resin 3 may be smaller than 1000 μm or may be larger than 5000 μm. The stretchable member 6 is formed by folding a piece of paper composed of a cellulose fiber assembly. When the absorbent resin 3A expands by absorbing the ink Q, the stretchable members 6 stretch in the Z direction, and the stretchable members 6 deform from the state illustrated in FIG. 27 into the state illustrated in FIG. 28. As a result, as indicated by the dashed arrow in FIG. 28, the ink Q flows between the stretchable member 6 and the absorbent resin 3A even after the absorbent resin 3A expands by absorbing the ink Q, forming a flow path for the ink Q between the stretchable member 6 and the absorbent resin 3A.

The liquid container according to this embodiment which stores the absorber 1G having such a structure brings about effects of stably achieving the required amount of ink Q absorption and further stably avoiding a problem of leakage of the ink Q through the connection port 95, which are the same effects as in the first embodiment.

10. Tenth Embodiment

Figure 29:
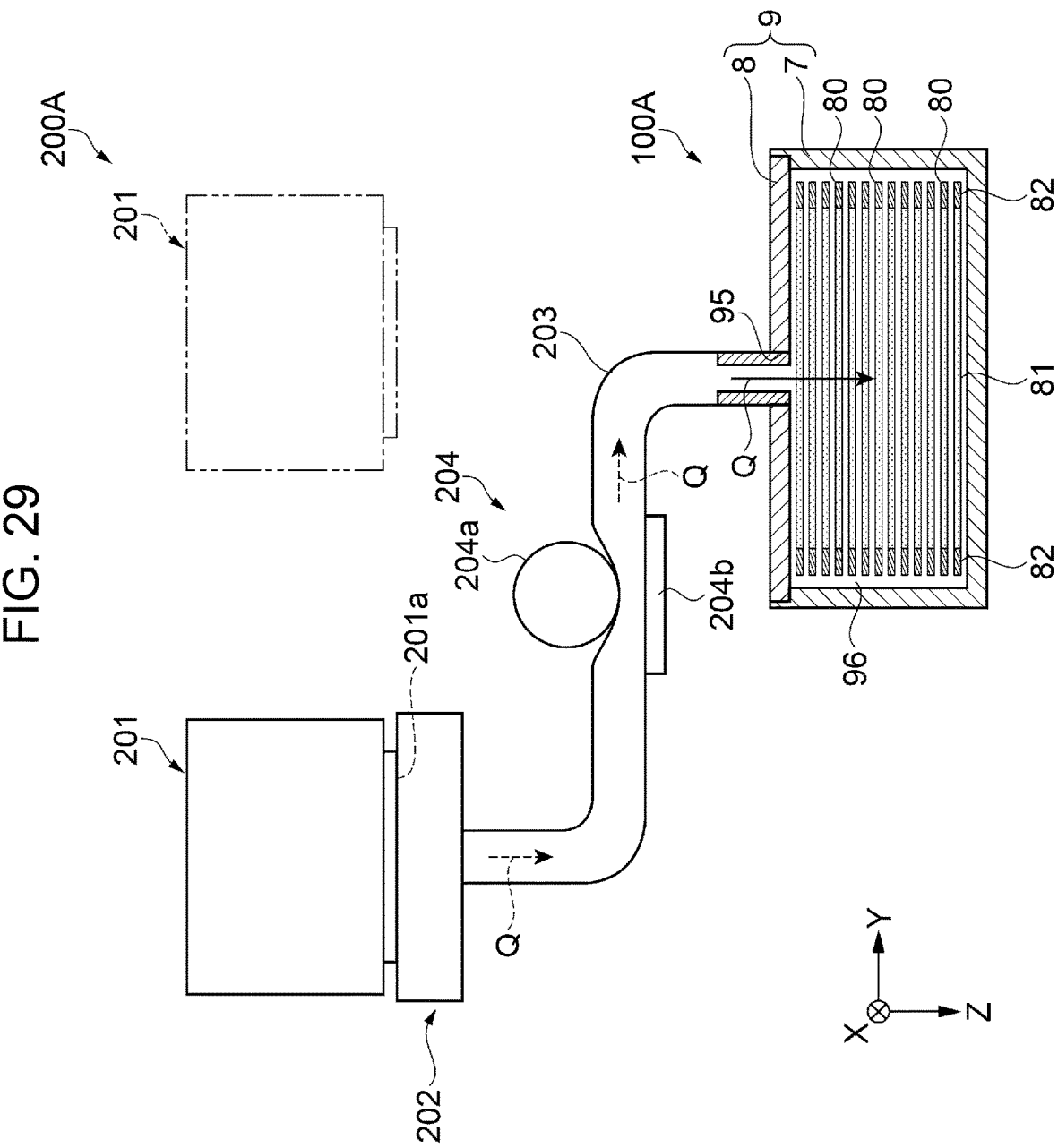
FIG. 29 is a schematic view of a printing apparatus having a liquid container according to a tenth embodiment.
Figure 30:
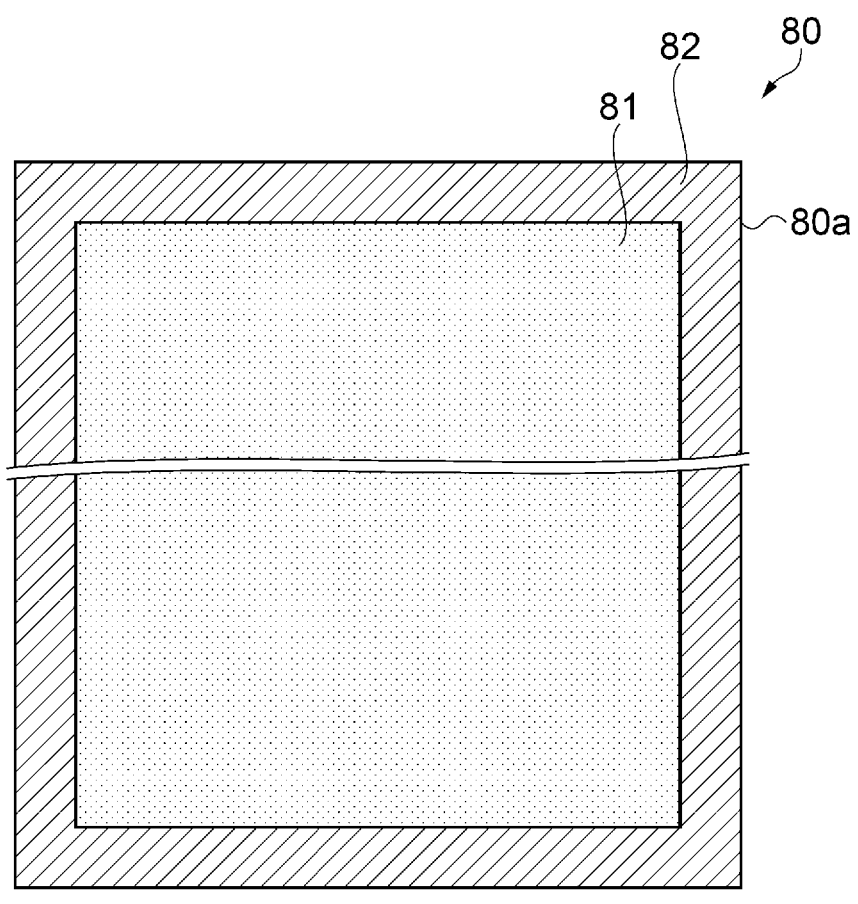
FIG. 30 is a schematic plan view of an absorber according to the tenth embodiment.

FIG. 29 is a schematic view of a printing apparatus 200A according to a tenth embodiment. FIG. 30 is a schematic plan view of an absorber 80 stored in a liquid container 100A according to this embodiment. In FIG. 29, a second region 82 of the absorber 80 is hatched. In FIG. 29 and FIG. 30, the transverse direction of the absorber 80 is the X direction, the longitudinal direction of the absorber 80 is the Y direction, and the direction in which an ink Q flows is the Z direction. The Z direction is the direction of gravity. Referring to FIG. 29 and FIG. 30, the overview of a liquid container according to this embodiment will be described below, mainly focusing on the differences from the first embodiment. The same components as those in the first embodiment are denoted by the same reference characters, and the overlapping description is omitted.

As illustrated in FIG. 29, the absorbers 80 having a sheet shape are stored in the liquid container 100A according to this embodiment, and the absorbers 80 having a sheet shape are stacked on top of one another in the Z direction. In other words, the absorbers 80 stored in the liquid container 100A are not in the form of small pieces obtained by shredding with a shredder or the like. The absorber 1 stored in the liquid container 100 according to the first embodiment is in the form of small pieces obtained by shredding with a shredder or the like (see FIG. 1). The printing apparatus 200A according to this embodiment has the same structure as the printing apparatus 200 according to the first embodiment except the form of the absorbers stored in the liquid container.

As illustrated in FIG. 30, the absorber 80 according to this embodiment has a first region 81 and the second region 82 located outside the first region 81. The first region 81 is away from an outer edge 80a of the absorber 80 by a predetermined distance and disposed inside the outer edge 80a of the absorber 80. The first region 81 has a rectangular shape. The region between the first region 81 and the outer edge 80a is the second region 82. The second region 82 has a frame shape. The second region 82 is disposed to surround the first region 81.

The first region 81 and the second region 82 in the absorber 80 each have the same structure as the absorber 1 according to the first embodiment and each have a structure in which the absorbent resins 3 are sandwiched between a pair of substrates 2. With the absorbent resins 3 swelling by absorbing the ink Q, the first region 81 of the absorber 80 is in the same conditions as the absorber 1 according to the first embodiment illustrated in FIG. 8. In other words, in the first region 81 of the absorber 80 according to this embodiment, with the absorbent resins 3 swelling by absorbing the ink Q, at least some of the absorbent resins 3 are spaced apart from the adjacent absorbent resins 3, and the spaces S serving as flow paths for the ink Q are not closed. The absorbent resins 3 are sparsely arranged in the first region 81. As a result, the spaces S serving as flow paths for the ink Q are not closed so that the ink Q flows in the first region 81 of the absorber 80 when the absorbent resins 3 swell by absorbing the ink Q.

In the second region 82 of the absorber 80, with the absorbent resins 3 swelling by absorbing the ink Q, the absorbent resins 3 are in contact with the adjacent absorbent resins 3, and the spaces S serving as flow paths for the ink Q are closed. The absorbent resins 3 are densely arranged in the second region 82. In the second region 82 of the absorber 80, the spaces S serving as flow paths for the ink Q are closed so that the ink Q does not flow when the absorbent resins 3 swell by absorbing the ink Q.

Returning to FIG. 29, the ink Q introduced into a storage space 96 of the liquid container 100A through the connection port 95 is first absorbed by absorbers 80 (hereinafter referred to as upper absorbers 80) disposed in the upper side of the storage space 96. Since the ink Q flows in the first region 81 of the absorbers 80 even when the absorbent resins 3 swell by absorbing the ink Q, the ink Q flows from the upper absorbers 80 toward absorbers 80 (hereinafter referred to as lower absorbers 80) disposed in the lower side of the storage space 96 as indicated by the solid arrow in the figure. Even when the amount of ink Q absorbed by the upper absorbers 80 reaches the limit, and the absorbent resins 3 of the upper absorbers 80 swell, the ink Q introduced through the connection port 95 flows toward the lower absorbers 80 and can be absorbed by all of the absorbers 80 stored in the storage space 96. Therefore, the liquid container 100A according to this embodiment brings about effects of stably achieving the required amount of ink Q absorption and further stably avoiding a problem of leakage of the ink Q through the connection port 95, which are the same effects as in the first embodiment.

With the absorbent resins 3 swelling by absorbing the ink Q, the ink Q absorbed by the absorbent resins 3 and the ink Q stored in the spaces S are present in the first region 81. In the first region 81, the ink Q absorbed by the absorbent resin 3 is strongly held by the absorbent resins 3, and the ink Q is unlikely to flow out of the absorber 80. The ink Q stored in the spaces S is weakly held in the spaces S and more easily flows than the ink Q absorbed by the absorbent resins 3. For example, when the liquid container 100A is tilted so that the absorbers 80 having a sheet shape are tilted, the ink Q stored in the spaces S tends to flow out of the first region 81.

With the absorbent resins 3 swelling by absorbing the ink Q, the absorbent resins 3 are in contact with the adjacent absorbent resins 3 so that the spaces S are closed in the second region 82, and only the ink Q absorbed by the absorbent resin 3 is present in the second region 82. Thus, the ink Q absorbed by the second region 82 is strongly held by the absorbent resins 3 and unlikely to flow out of the second region 82. With the absorbent resins 3 swelling by absorbing the ink Q, the second region 82 works as a barrier layer that inhibits the flow of the ink Q.

For example, with the liquid container 100A attached to the printing apparatus 200A, the posture of the liquid container 100A is not changed, and the ink Q is stably held in the first region 81 of the absorber 80. However, when the amount of ink Q absorbed by the liquid container 100A reaches the limit, and the liquid container 100A is tilted in order to take out the liquid container 100A, the ink Q stored in the spaces S of the first region 81 is about to flow out of the first region 81 and possibly leaks out of the liquid container 100A through the connection port 95.

Since the second region 82 works as a barrier layer that inhibits the flow of the ink Q when the absorbent resin 3 swells by absorbing the ink Q, the second region 82 disposed to surround the first region 81 functions as a kind of embankment for preventing the ink Q stored in the spaces S of the first region 81 from flowing out of the first region 81. Thus, when the liquid container 100A is tilted with the absorbent resins 3 swelling by absorbing the ink Q, and the ink Q stored in the spaces S of the first region 81 is about to flow out of the first region 81, the flow of the ink Q stored in the spaces S of the first region 81 is inhibited by the second region 82. The ink Q stored in the spaces S of the first region 81 is unlikely to flow out of the first region 81. Therefore, when the liquid container 100A is tilted in order to take out the liquid container 100A, there is less possibility that the ink Q of the first region 81 flows out of the first region 81 and leaks out of the liquid container 100A through the connection port 95.

As described above, the absorber 80 according to this embodiment includes the first region 81 in which the absorbent resins 3 are sparsely arranged and the second region 82 which is located outside the first region 81 and in which the absorbent resins 3 are densely arranged. In the absorber 80, with the absorbent resins 3 swelling by absorbing the ink Q, at least some of the absorbent resins 3 in the first region 81 are spaced apart from the adjacent absorbent resins 3, and the absorbent resins 3 in the second region 82 are in contact with the adjacent absorbent resins 3. The liquid container 100A according to this embodiment which stores the absorber 80 having such a structure brings about great effects of stably avoiding a problem of leakage of the ink Q in the first region 81 from the liquid container 100A through the connection port 95 when the liquid container 100A is tilted, in addition to the effects of the first embodiment.

The above embodiments can be modified and carried out as described below. The above embodiments and the following modifications can be carried out in combination as long as no technical inconsistency occurs.

1) In the above embodiments, the liquid container 100 is not limited to a detachable waste liquid tank and may be, for example, a stationary storage unit provided inside the printing apparatus 200 or may be a liquid container 100 which is separate from the printing apparatus 200 and connected to a tube 203 outside the printing apparatus 200.

2) In the above embodiments, the permeable members and the absorbers are not necessarily stacked on top of one another in the Z direction. For example, the permeable members and the absorbers may be stacked on top of one another in the X direction or may be stacked on top of one another in the Y direction.

3) In the above embodiments, the connection port 95 which is an example liquid introduction port is not necessarily formed in the lid 8 and may be, for example, formed on the side surface of the container 7.

What is claimed is:

1. A liquid container comprising:
   a case having a liquid introduction port through which liquid is introduced and a storage portion that stores the liquid; and
   an absorber stored in the case and configured to absorb the liquid, wherein
   the absorber includes
   a plurality of absorbent resins that swell by absorbing the liquid and
   a substrate that supports the absorbent resins and allows the liquid to permeate therethrough, and
   when the absorbent resins swell by absorbing the liquid, at least some of the absorbent resins are spaced apart from the adjacent absorbent resins, wherein
   the absorber includes
   a first substrate having a plurality of the absorbent resins supported therein and
   a second substrate having a plurality of the absorbent resins supported therein,
   the first substrate and the second substrate are stacked on top of each other in a stacking direction in the case, and
   in plan view in the stacking direction, the absorbent resins supported in the first substrate and the absorbent resins supported in the second substrate are positioned such that at least some of the absorbent resins supported in the first substrate do not overlap at least some of the absorbent resins supported in the second substrate.

2. The liquid container according to claim 1, wherein, when the absorbent resins swell by absorbing the liquid, a proportion of the absorbent resins spaced apart from the adjacent absorbent resins with respect to the absorbent resins supported on the substrate is 10% or more and 100% or less.

3. The liquid container according to claim 1, further comprising a permeable member that allows the liquid to permeate therethrough, wherein
   the absorber and the permeable member are stacked on top of each other in a stacking direction in the case,
   the permeable member has a plurality of holes that penetrate the permeable member in the stacking direction, and
   in plan view in the stacking direction, the absorbent resins in the absorber and the holes in the permeable member are positioned such that at least some of the absorbent resins in the absorber overlap at least some of the holes in the permeable member.

4. The liquid container according to claim 1, wherein the absorber includes
a first region in which the absorbent resins are sparsely arranged and
a second region that is located outside the first region and in which the absorbent resins are densely arranged, and
when the absorbent resins swell by absorbing the liquid, at least some of the absorbent resins in the first region are spaced apart from the adjacent absorbent resins, and the absorbent resins in the second region are in contact with the adjacent absorbent resins.

5. A liquid container comprising:
a case having a liquid introduction port through which liquid is introduced and a storage portion that stores the liquid; and
an absorber stored in the case and configured to absorb the liquid, wherein
the absorber includes
a first resin group in which a plurality of absorbent resins that swell by absorbing the liquid are arranged in a line in a first direction,
a second resin group in which a plurality of absorbent resins that swell by absorbing the liquid are arranged in a line in the first direction with a space between the second resin group and the first resin group, and
a substrate that supports the first resin group and the second resin group and allows the liquid to permeate therethrough, and
with the absorbent resins swelling by absorbing the liquid, at least some of the absorbent resins of the first resin group are spaced apart from the absorbent resins of the second resin group, wherein
the absorber includes
a first substrate that supports the first resin group and the second resin group and
a second substrate that supports the first resin group and the second resin group,
the first substrate and the second substrate are stacked on top of each other in a stacking direction, in the case, and
in plan view in the stacking direction, the first resin group and the second resin group supported in the first substrate intersect the first resin group and the second resin group supported in the second substrate.

6. The liquid container according to claim 5, wherein the absorber includes
a first substrate that supports the first resin group and the second resin group and
a second substrate that supports the first resin group and the second resin group,
the first substrate and the second substrate are stacked on top of each other in a stacking direction in the case, and
in plan view in the stacking direction, the first resin group and the second resin group supported in the first substrate and the first resin group and the second resin group supported in the second substrate are positioned such that at least portions of the first and second resin groups supported in the first substrate do not overlap at least portions of the first and second resin groups supported in the second substrate.

7. A liquid container comprising:
a case having a liquid introduction port through which liquid is introduced and a storage portion that stores the liquid; and
an absorber stored in the case and configured to absorb the liquid, wherein
the absorber includes
a first ring-shaped resin group in which a plurality of absorbent resins that swell by absorbing the liquid are arranged in a ring shape,
a second ring-shaped resin group in which a plurality of absorbent resins that swell by absorbing the liquid are arranged in a ring shape with a space between the second ring-shaped resin group and the first ring-shaped resin group, and
a substrate that supports the first ring-shaped resin group and the second ring-shaped resin group and that allows the liquid to permeate therethrough, and
when the absorbent resins swelling by absorbing the liquid, at least some of the absorbent resins of the first ring-shaped resin group are spaced apart from the absorbent resins of the second ring-shaped resin group, wherein
the absorber includes
a first substrate that supports the first ring-shaped resin group and the second ring-shaped resin group and
a second substrate that supports the first ring-shaped resin group and the second ring-shaped resin group,
the first substrate and the second substrate are stacked on top of each other in a stacking direction in the case, and
in plan view in the stacking direction, the first ring-shaped resin group and the second ring-shaped resin group supported in the first substrate and the first ring-shaped resin group and the second ring-shaped resin group supported in the second substrate are positioned such that at least portions of the first and second ring-shaped resin groups supported in the first substrate do not overlap at least portions of the first and second ring-shaped resin groups supported in the second substrate.

* * * * *